(12) United States Patent
Uchida et al.

(10) Patent No.: US 11,175,440 B2
(45) Date of Patent: Nov. 16, 2021

(54) DIFFUSER PLATE AND PROJECTION-TYPE IMAGE DISPLAYING DEVICE

(71) Applicant: KURARAY CO., LTD., Kurashiki (JP)

(72) Inventors: Atsushi Uchida, Kamisu (JP); Masaru Karai, Kamisu (JP)

(73) Assignee: KURARAY CO., LTD., Kurashiki (JP)

(*) Notice: Subject to any disclaimer, the term of this patent is extended or adjusted under 35 U.S.C. 154(b) by 226 days.

(21) Appl. No.: 16/338,849

(22) PCT Filed: Oct. 2, 2017

(86) PCT No.: PCT/JP2017/035802
§ 371 (c)(1),
(2) Date: Apr. 2, 2019

(87) PCT Pub. No.: WO2018/066501
PCT Pub. Date: Apr. 12, 2018

(65) Prior Publication Data
US 2020/0284952 A1 Sep. 10, 2020

(30) Foreign Application Priority Data
Oct. 3, 2016 (JP) .............. JP2016-195461

(51) Int. Cl.
G02B 5/02 (2006.01)
(52) U.S. Cl.
CPC .......... G02B 5/0268 (2013.01); G02B 5/0221 (2013.01)
(58) Field of Classification Search
CPC .......... G02B 5/02; G02B 5/09; G02B 5/0215; G02B 5/0257; G02B 5/0278;
(Continued)

(56) References Cited

U.S. PATENT DOCUMENTS 6,498,685 B1* 12/2002 Johnson ............... B81C 1/0038
347/241
7,113,333 B2 9/2006 Kamijima
(Continued)

FOREIGN PATENT DOCUMENTS

EP 2 916 149 A1 9/2015
JP 2004-505306 A 2/2004
(Continued)

OTHER PUBLICATIONS

Lee et al., "The Design and Fabrication of an Optical Diffuser for Head-up Displays", *Proceedings of SPIE/IS&T*, vol. 9302, pp. 93023Q1-93023Q5 (2015).
(Continued)

*Primary Examiner* — Mustak Choudhury
(74) *Attorney, Agent, or Firm* — Greenblum & Bernstein, P.L.C.

(57) ABSTRACT

The present invention provides a diffuser plate whose luminance of emission light emitted from a microlens is even in a diffusion range. The diffuser plate comprises a projection side main surface, an emission side main surface, and a fine structure having a plurality of microlens shape parts with a microlens-like shape. A numerical aperture NA of the projection light is greater than 0 and 0.140 or less. An incident angle $\theta i$ formed by an optical axis of the projection light at the microlens shape part and a normal of the projection side main surface intersecting with each other is in a range of 0 to 50 degrees. At least one of the plurality of microlens shape parts emits the emission light at an emission angle $\theta o$ formed by the optical axis of the emission light and the normal of the projection side main surface intersecting with each other.

17 Claims, 15 Drawing Sheets

(58) Field of Classification Search
CPC .. G02B 5/0268; G02B 5/0221; G02B 5/0294;
G02B 27/01; G02B 27/0101; G02B 3/00;
G02B 3/0006; G02B 3/0062; G02B
3/0043; G02B 3/0056; G03B 21/006;
G03B 21/16; G03B 21/28; G03B 21/62;
G03B 21/625; G03B 26/10; H04N
9/3152; H04N 9/315; B60K 35/00
See application file for complete search history.

(56) References Cited

U.S. PATENT DOCUMENTS

| | | |
|---|---|---|
| 2004/0130790 A1 | 7/2004 | Sales |
| 2005/0078367 A1 | 4/2005 | Kamijima |
| 2005/0275952 A1 | 12/2005 | Odagiri et al. |
| 2016/0266283 A1 | 9/2016 | Segawa |
| 2017/0235028 A1 | 8/2017 | Uchida et al. |
| 2018/0106930 A1 | 4/2018 | Uchida et al. |

FOREIGN PATENT DOCUMENTS

| | | | |
|---|---|---|---|
| JP | 2005-70631 A | | 3/2005 |
| JP | 2005-351952 A | | 12/2005 |
| JP | 2007-183498 A | | 7/2007 |
| JP | 2007183498 A | * | 7/2007 |
| JP | 2010-145745 A | | 7/2010 |
| WO | WO 02/10804 A1 | | 2/2002 |
| WO | 2014/119407 A1 | | 8/2014 |
| WO | WO 2016/051766 A1 | | 4/2016 |
| WO | 2016/143350 A1 | | 9/2016 |

OTHER PUBLICATIONS

Extended European Search Report issued in EP Patent Application No. 17858339.9, dated Mar. 24, 2020.
International Search Report dated Dec. 26, 2017 in PCT/JP2017/035802 filed Oct. 2, 2017.

* cited by examiner

DIFFUSER PLATE AND PROJECTION-TYPE IMAGE DISPLAYING DEVICE

TECHNICAL FIELD

The present invention relates to a diffuser plate and a projection-type image displaying device.

BACKGROUND ART

A diffuser plate using a microlens array is used as a screen for head-up displays and laser projectors. An advantage of using the microlens array is that speckle noise in a laser beam can be reduced more than when a diffuser plate such as a translucent plate or ground glass is used.

Patent Literature 1 discloses an image forming apparatus including a diffuser plate. The diffuser plate uses a laser beam as a light source and includes a laser projector that projects an image formed by an arrangement of a plurality of pixels and a microlens array in which a plurality of microlenses are arranged. When a microlens array is used, incident light can be appropriately diffused, and a necessary diffusion angle can be freely designed.

Patent Literature 2 discloses a diffuser plate whose microlens has a piston shape (raised part) with a vertical side surface. Also, it discloses a diffuser plate, in which at least one parameter defining a shape or a position of a fine structure including the microlens is randomly distributed in accordance with a predetermined probability density function. Furthermore, it discloses that a light beam is collimated by rotating respective fine structures in such a diffuser plate. Each of the micro lenses has an optical axis not parallel to an optical axis of the entire screen. The optical axis of the light beam emitted from the microlens is inclined to the optical axis of the light beam incident on the microlens, and is not parallel.

CITATION LIST

Patent Literature

[Patent Literature 1] Japanese Unexamined Patent Application Publication No. 2010-145745
[Patent Literature 2] Published Japanese Translation of PCT International Publication for Patent Application, No. 2004-505306

SUMMARY OF INVENTION

Technical Problem

The inventors of the present application found the following problems.

It is required that the optical axis of the emission light is inclined to the optical axis of the incident light, the emission light is diffused in a predetermined diffusion range, and the luminance becomes even. Also, when the incident light is incident inclined to the diffuser plate, its luminance is required to be even. Furthermore, a diffuser plate having a microlens for emitting the required emission light is desired.

The diffuser plate disclosed in Patent Literature 2 emits the emission lights having optical axes inclined to the optical axis of the incident light from the respective microlenses. However, the luminance might be uneven, because the diffusion distribution of the emission light is eccentric or the projection shape of the diffusion light is distorted. When the incident light is inclined to the diffuser plate and becomes incident, the luminance might be uneven.

The present invention provides a diffuser plate, in which luminance of emission light is even in a diffusion range.

Solution to Problem

A diffuser plate according to the present invention is a diffuser plate used for a projection optical system including a projection side main surface (for example, a main surface 1a) to which projection light is projected, an emission side main surface (for example, a main surface 1b) for emitting emission light, and a fine structure having a lens function on at least one of the projection side main surface and the emission side main surface, in which a numerical aperture NA of the projection light is greater than 0 and 0.140 or less, the fine structure has a plurality of microlens shape parts having a microlens-like shape, an incident angle $\theta i$ formed by an optical axis of the projection light at the microlens shape part and a normal of the projection side main surface intersecting with each other is in a range of 0 to 50 degrees, at least one of the plurality of microlens shape parts emits the emission light at an emission angle $\theta o$ formed by the optical axis of the emission light at the microlens shape part and the normal of the projection side main surface intersecting with each other, the emission angle $\theta o$ is different from the incident angle $\theta i$.

the emission light has substantially even luminance in a desired diffusion angle range, and a cross sectional shape of the microlens shape part in a cross section substantially vertical to a microlens reference surface of the microlens shape part has an asymmetrical cross sectional shape around the optical axis of the projection light.

The diffuser plate according to the present invention is a diffuser plate used for a projection optical system including a projection side main surface to which projection light is projected, an emission side main surface for emitting emission light, and a fine structure having a lens function on at least one of the projection side main surface and the emission side main surface, in which a numerical aperture NA of the projection light is greater than 0 and 0.140 or less, the fine structure has a plurality of microlens shape parts having a microlens-like shape, an incident angle $\theta i$ formed by an optical axis of the projection light at the microlens shape part and a normal of the projection side main surface intersecting with each other is greater than 0 degrees and 50 degrees or less, at least one of the plurality of microlens shape parts emits the emission light at an emission angle $\theta o$ formed by the optical axis of the emission light at the microlens shape part and the normal of the projection side main surface intersecting with each other, the emission angle $\theta o$ is the same as the incident angle $\theta i$, the emission light has substantially even luminance in a desired diffusion angle range, and a cross sectional shape of the microlens shape part in a cross section substantially vertical to a microlens reference surface of the microlens shape part has an asymmetrical cross sectional shape around the optical axis of the projection light.

Also, in the measurement luminance distribution to the diffusion angle, when the diffusion angle corresponding to the position of the optical axis of the emission light is designated as an optical axis diffusion angle θa, an integrated value To of the measurement luminance from a minimum angle θmin in a predetermined range of the diffusion angle to the optical axis diffusion angle θa is 50% of the integrated value Ta of the measurement luminance in the entire range of the diffusion angle, an absolute value of a difference of an angle formed by the optical axis of the projection light and the optical axis of the emission light intersecting with each other varies within 0-40 degrees, luminance Ls at a predetermined diffusion angle θs and luminance Lb at the predetermined diffusion angle θb respectively correspond to 70% of the optical axis luminance Lo at the optical axis of the emission light, when the predetermined diffusion angle θs is smaller than the optical axis diffusion angle θa and the predetermined diffusion angle θb is larger than the optical axis diffusion angle θa, evenness evaluation index Ts/Tb that is a ratio of the integrated value Ts of the luminance obtained by subtracting Lo*0.7 from each luminance from the diffusion angle θs to the optical axis diffusion angle θa and the integrated value Tb of the luminance from the optical axis diffusion angle θa to the predetermined diffusion angle θb satisfies D<Ts/Tb<1/D, and a lower limit value D of the allowable range of the evenness evaluation index Ts/Tb satisfies $D=0.63*\exp(0.45*((90-(\theta s+\theta b))/90)^2)$.

Also, the bottom surface shape of the microlens shape part is rectangular, and the microlens shape parts are periodically arranged in a lattice manner.

The height H1 [μm] from the deepest part to the uppermost part of the microlens shape part satisfies: $0<H1\leq 75$.

On one hand, a projection-type image displaying device according to the present invention comprises the above-mentioned diffuser plate, and a projection device for projecting the projection light to the diffuser plate.

On the other hand, a method for designing a diffuser plate according to the present invention is a diffuser plate designing method for designing a light diffusion pattern of the diffuser plate including a projection side main surface to which projection light is projected, and an emission side main surface for emitting emission light including a reference microlens designing step for preparing a reference microlens so that a desired light diffusion property is achieved when it is assumed that light is projected vertical to the projection side main surface of the diffuser pate, and an inclination coping lens designing step for coping with inclination of the optical axis of the projection light and inclination of the optical axis of the emission light to the shape of the reference microlens, based on the inclination of the optical axis of the projection light at each position of the projection side main surface of the diffuser plate, the inclination of the optical axis of the projection light at each position of the projection side main surface of the diffuser plate, and a light distribution property of the emission light, in which in the inclination coping lens designing step, lens designing parameters include a center position displacement amount for displacing a center position of the lens.

In the inclination coping lens designing step, the lens designing parameters may further include a lens inclination amount.

In the inclination coping lens designing step, the lens designing parameters may further include a lens curvature radius change amount for enlarging or reducing a lens curvature radius.

In the inclination coping lens designing step, the lens designing parameters may further include an adjustment amount for adjusting a lens shape by a cubic function or a similar function.

The reference microlens may have a lens shape for respectively controlling two cross sectional shapes in two different cross sections including a normal direction of the projection side main surface or the emission side main surface, and design a lens for the two cross sectional shapes of the reference microlens.

The reference microlens may have a toroidal shape, or a biconical surface.

The diffuser plate according to the present invention comprises a main surface to which projection light is projected and from which reflection light is reflected, and a fine structure having a mirror function on the main surface, in which a numerical aperture NA of the projection light is greater than 0 and 0.140 or less, the fine structure has a plurality of microlens shaped mirror parts having a microlens-like shape, an incident angle θi formed by an optical axis of the projection light at the microlens shaped mirror part and a normal of the main surface intersecting with each other is in a range of 0 to 50 degrees, at least one of the plurality of microlens shaped mirror parts reflects the reflection light at a reflection angle formed by the optical axis of the reflection light at the microlens shaped mirror part and the normal of the main surface intersecting with each other, the reflection light is different from the incident angle θi, the reflection light has substantially even luminance in a desired diffusion angle range, and a cross sectional shape of the microlens shaped mirror part in a cross section substantially vertical to a microlens reference surface of the microlens shaped mirror part has an asymmetrical cross sectional shape around the optical axis of the projection light.

The diffuser plate according to the present invention comprises a main surface to which projection light is projected and from which a reflection light is reflected, and a fine structure having a mirror function on the main surface, in which a numerical aperture NA of the projection light is greater than 0 and 0.140 or less, the fine structure has a plurality of microlens shaped mirror parts having a microlens-like shape, an incident angle θi formed by an optical axis of the projection light at the microlens shaped mirror part and a normal of the main surface intersecting with each other is greater than 0 degrees and 50 degrees or less, at least one of the plurality of microlens shaped mirror parts reflects the reflection light at a reflection angle formed by the optical axis of the reflection light at the microlens shaped mirror part and the normal of the main surface intersecting with each other, the reflection light is the same as the incident angle θi, the reflection light has substantially even luminance in a desired diffusion angle range, and a cross sectional shape of the microlens shaped mirror part in a cross section substantially vertical to a microlens reference surface of the microlens shaped mirror part has an asymmetrical cross sectional shape around the optical axis of the projection light.

Advantageous Effects of Invention

According to the present invention, it is possible to provide a diffuser plate in which luminance of emission light is even in a diffusion range.

DESCRIPTION OF EMBODIMENTS

First Embodiment

Figure 1:
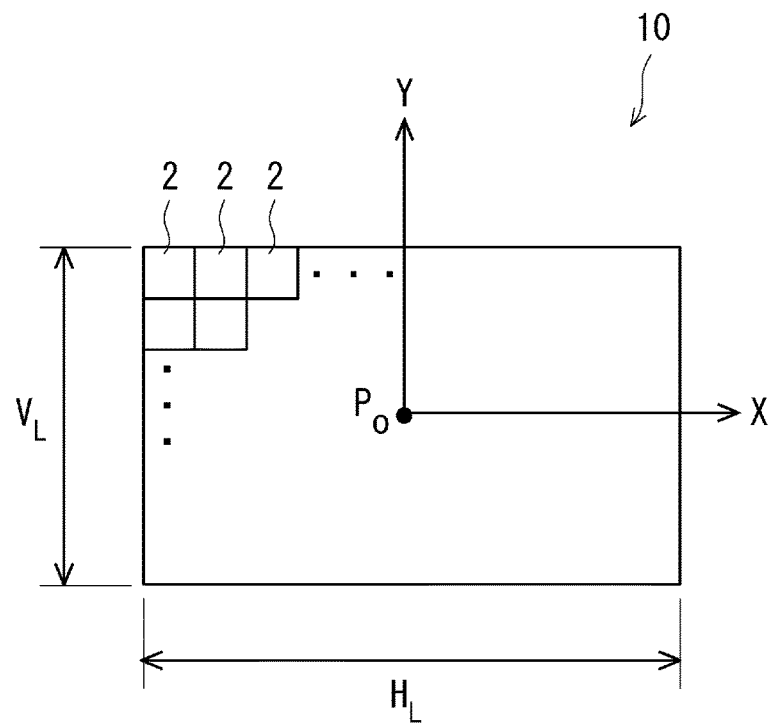
FIG. 1 is a schematic top view showing a configuration of a diffuser plate according to a first embodiment.
Figure 2:
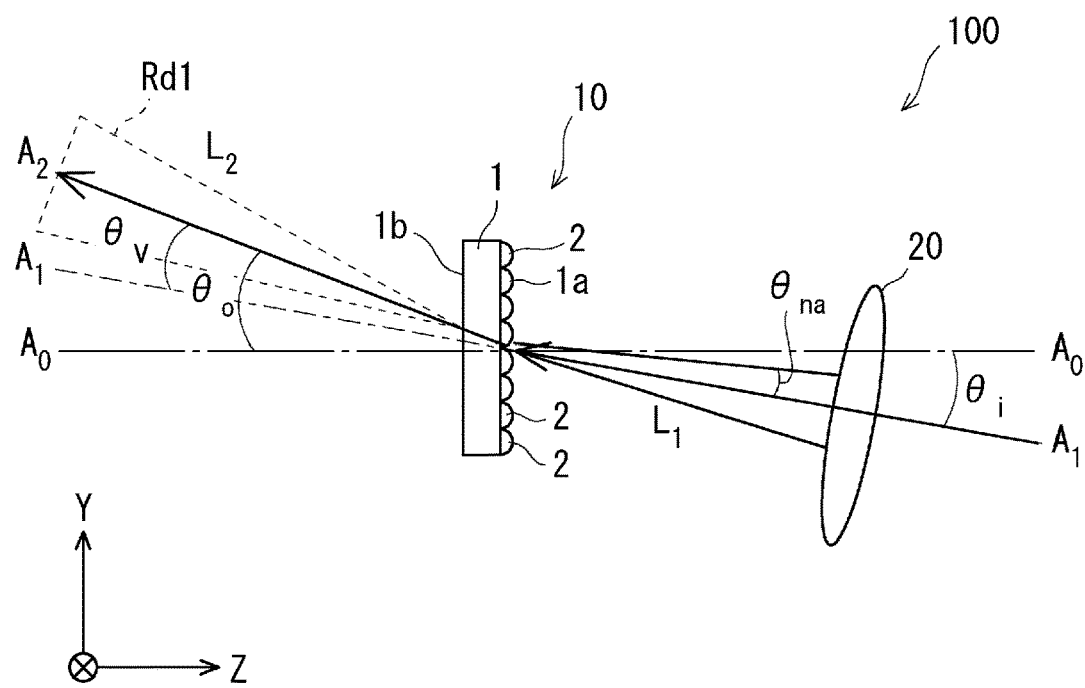
FIG. 2 is a schematic view showing a projection-type imaging device according to the first embodiment.
Figure 3:
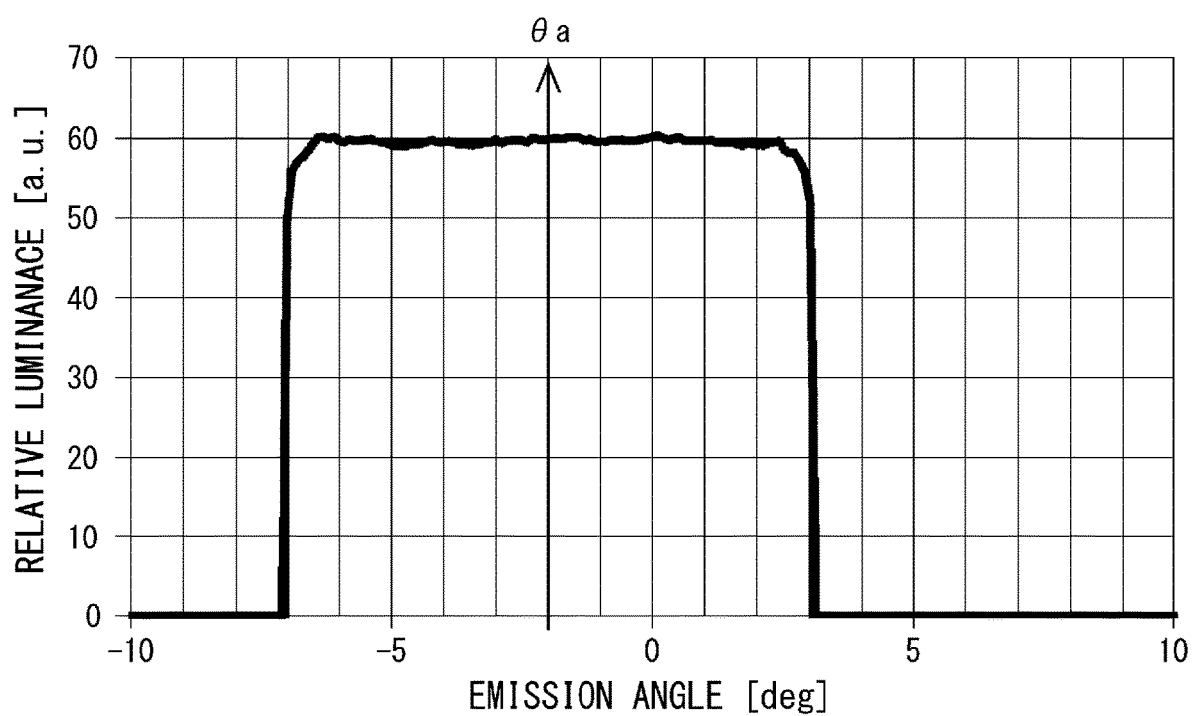
FIG. 3 is a graph showing luminance to a diffusion angle of emission light emitted from one example of the diffuser plate according to the first embodiment.

With reference to FIG. 1 to FIG. 3, the diffuser plate according to the first embodiment will be explained. FIG. 1 is a schematic top view showing a configuration of a diffuser plate according to the first embodiment. FIG. 2 is a schematic view showing a projection-type imaging device according to the first embodiment. FIG. 3 is a graph showing luminance to a diffusion angle of emission light emitted from one example of the diffuser plate according to the first embodiment. In FIG. 1, an xy coordinate system with the main surface of the diffuser plate being the origin is defined. In FIG. 2, a right-side xyz coordinate system is defined, and described at a portion away from the main surface 1a of the diffuser plate 10 for clarity of the drawing.

As shown in FIG. 1 and FIG. 2, the diffuser plate 10 comprises a substrate 1, and a plurality of microlenses 2 arranged on the substrate 1. Concretely, the substrate 1 includes main surfaces 1a, 1b, and the plurality of microlenses 2 are arranged on the main surface 1a in a lattice manner. For example, the diffuser plate 10 and the substrate 1 are rectangular plate-like bodies having long sides with length $H_L$ in a horizontal direction H, and short sides with length $V_L$ in a vertical direction V. The horizontal direction H and the vertical direction V correspond to directions of image and the like, when the emission light collides with the diffuser plate 10 to display the image and the like on an object. In this example, the diffuser plate 10 is fixed in a predetermined direction, and the horizontal direction H is along an X direction and the vertical direction V is along a Y direction. The shapes of the plurality of microlenses 2 are controlled so that the optical axis of the emission light is inclined to the optical axis of the incident light at a desired inclination angle. The shapes of the plurality of microlenses 2 are controlled so that the emission light has a desired diffusion shape and a desired diffusion range.

In one example shown in FIG. 1, the microlenses 2 are arranged in a rectangular lattice manner. The lattice arrangement of the microlenses 2 is not limited to a rectangular lattice, and instead may be a tetragonal lattice, a regular triangular lattice, an oblique lattice, a parallel lattice, or the like. The shapes of the bottom surfaces of the plurality of microlenses 2 are not limited to rectangles such as squares or rectangles and instead may be quadrangles, hexagons, or other polygons. It is preferable that the plurality of microlenses 2 be periodically arranged on the main surface 1a of the substrate 1. Also, the diffuser plate 10 may include a fine structure (not shown) having a lens function, instead of the microlens 2. The fine structure comprises a plurality of microlens shape parts (not shown) having a microlens-like shape. Preferably, the height H1 [μm] from the deepest part to the uppermost part of the microlens shape part satisfies: 0<H1≤75. In the diffuser plate used for a projection-type image displaying device, the height H1 of the microlens shape part is important. When the height H1 is 75 μm or less, it becomes difficult to visually recognize the respective microlenses. Therefore, it becomes difficult to cause a granular texture in the image displayed by the projection-type image displaying device. Accordingly, the height H1 of the microlens shape part is preferably 75 μm or less. Also, it is better that the height H1 is 0 μm or more.

The cross sectional shape of the microlens shape part in a cross section substantially vertical to a microlens reference surface (not shown) of the microlens shape part may have an asymmetrical cross sectional shape around an optical axis A1 of projection light L1. Here, the microlens reference surface corresponds to the bottom surface of the microlens 2.

The diffuser plate 10 may be used as one constitutional element of the projection-type image displaying device. As shown in FIG. 2, the projection-type image displaying device 100 comprises a diffuser plate 10, and a projection device 20 for projecting projection light L1. When the projection light L1 is projected to the diffuser plate 10, images and images are displayed on the diffuser plate 10. Concretely, when the projection-type image displaying device 100 is used as a vehicle-mounted head-up display, if the projection light L1 is projected to the diffuser plate 10, the image and the image are displayed on the diffuser plate 10. Then, the image and the image are visually recognized by a user through a mirror (not shown) and a front window (not shown) of a vehicle according to a need.

A projection device 20 is arranged at a position that it can project and diffuse the projection light L1 toward the diffuser plate 10. In the projection-type image displaying device 100 shown in FIG. 2, the projection device 20 is arranged on the main surface 1a side of the substrate 1 of the diffuser plate 10, but the projection device 20 may be arranged on the main surface 1b side of the substrate 1 of the diffuser plate 10.

The projection device 20 projects the projection light L1 toward the diffuser plate 10. The projection light L1 of the diffuser plate 10 is incident on the microlens 2 and the main surface 1a. An axis A0 is substantially vertical to the main surface 1a. An angle formed by the axis A0 and an optical axis A1 of the projection light L1 is an incident angle θi to the diffuser plate 10 of the projection light L1. Here, the incident angle θi is preferably in a range from 0 degrees to 50 degrees. Herein, "degree" and "deg" are used as a unit of an angle, and any of them indicate a unit with the same meaning. In the diffuser plate having a structure with fine unevenness (lens) on the surface, the incident light exceeding 50 degrees might cause interior total reflection inside the diffuser plate, so as to deteriorate uneven luminance. Therefore, the incident angle θi is preferably 50 degrees or less.

After the projection light L1 is incident on the diffuser plate 10, it passes through the diffuser plate 10, and is emitted from the main surface 1b of the diffuser plate 10 as emission light L2. The emission light L2 advances along the optical axis A2, while being diffused in a diffusion range Rd. When a maximum angle of the projection light L1 projected to the diffuser plate 10 from the projection device 20 relative to the optical axis A1 is designated as $\theta_{na}$, the numerical aperture NA of the projection light L1 is expressed by the following expression 1.

[Expression 1]

$$NA=\sin(\theta_{na})$$ (expression 1)

The numerical aperture NA is preferably 0.140 or less. Generally, an LED and a laser are used as a light source of the projection light. When the image is projected using these light sources, high precision image can be obtained by making NA of the projection light to 0.140 or less. Also, the numerical aperture NA may be larger than 0.

(One Example of Definition of Optical Axis of Emission Light)

Figure 16:
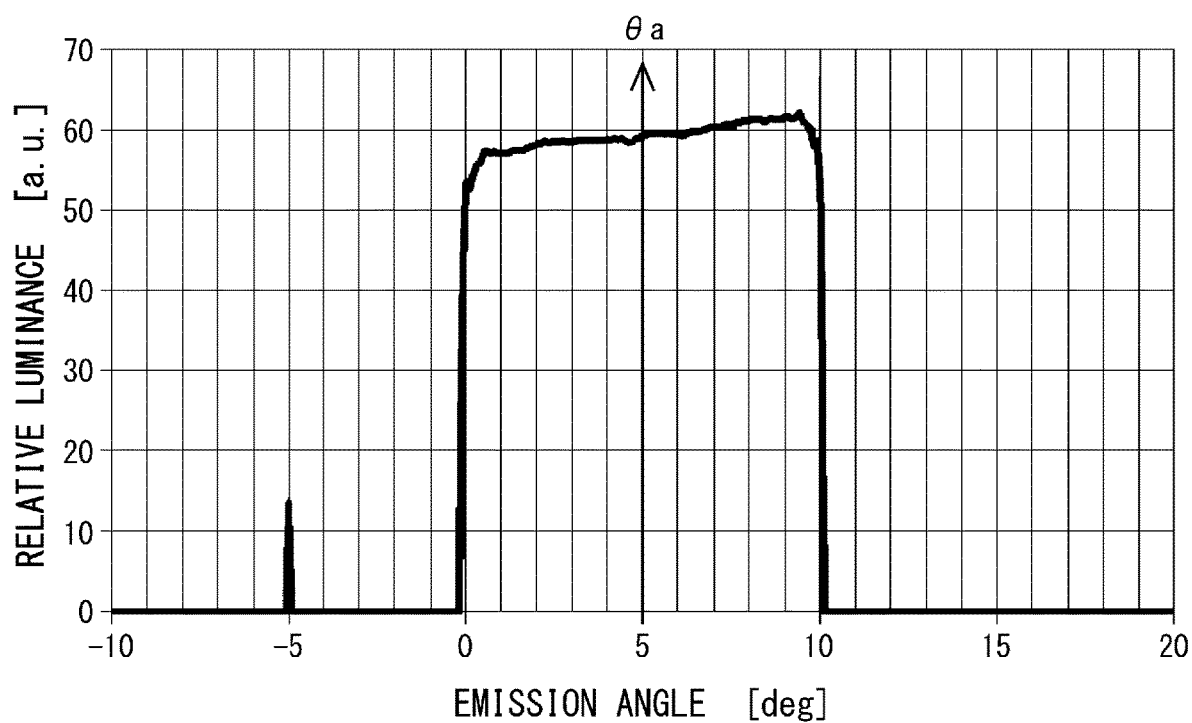
FIG. 16 is a graph showing luminance to the diffusion angle of the emission light emitted from the diffuser plate.

With reference to FIG. 3 and FIG. 16, one example of the definition of the optical axis A2 of the emission light L2 will be explained. FIG. 3 is a graph showing luminance to a diffusion angle of emission light emitted from one example of the diffuser plate according to the first embodiment. FIG. 16 is a graph showing luminance to the diffusion angle of the emission light emitted from the diffuser plate. As shown in FIG. 3 and FIG. 16, in light distribution properties, an angle that becomes a half of an integrated value of total luminance on a measurement cross section to be evaluated when integrated from the left side is defined as an optical axis of the emission light. Concretely, in the measurement luminance distribution to a predetermined range of the diffusion angle, the diffusion angle corresponding to the position of the optical axis of the emission light is designated as an optical axis diffusion angle θa. An integrated value To of the measurement luminance from a minimum angle θmin to an optical axis diffusion angle θa in a predetermined range of the diffusion angle is defined as 50% of the integrated value Ta of the measurement luminance in a total range of the diffusion angle.

Again, with reference to FIG. 2, the projection-type image displaying device 100 having the diffuser plate 10 will be explained.

An angle formed by an axis A0 of the entire diffuser plate 10 and the optical axis A2 of the emission light L2 is an emission angle θo of the emission light L2 to the diffuser plate 10. The emission angle θo is different from the incident angle θi, that is to say, it is larger or smaller than the incident angle θi. The optical axis A2 of the emission light L2 is inclined to the optical axis A1 of the projection light L1 at a predetermined angle. That is to say, the optical axis A2 does not extend in the same direction as the optical axis A1, and is not parallel to the optical axis A1. The optical axis A2 of the emission light L2 is curved to the optical axis A1 of the projection light L1 at an optical axis displacement angle θv. That is to say, an angle formed by the optical axis A2 and the optical axis A1 is the optical axis displacement angle θv. It is preferable that, an absolute value of the difference between the emission angle θo and the incident angle θi is the optical axis displacement angle θv, and the optical axis displacement angle θv is within 0 to 40 degrees. The larger the optical axis displacement angle θv gets, the inclination angle of the fine unevenness tends to get larger. When the optical axis displacement angle θv is 40 degrees or less, it becomes difficult to totally reflect the light incident on the projection plate inside. Therefore, the incident light is stably emitted from the projection plate, and significantly gives good influences such as that the luminance of the image is stable. Thus, the optical axis displacement angle θv is preferably made to 40 degrees or less.

The emission light L2 is evenly diffused with the optical axis A2 as a center. Concretely, the luminance of the emission light L2 is distributed so that it is symmetrical with the optical axis A2 as a center on a plane substantially vertical to the optical axis A2. The luminance of the emission light L2 may be reduced according to a distance from the optical axis A2, and may be constant regardless of the distance from the optical axis A2, on the plane substantially vertical to the optical axis A2.

Accordingly, the projection-type image displaying device 100 can emit the emission light L2 with the optical axis A2 inclined to the optical axis A1 of the projection light L1. The projection-type image displaying device 100 emits the projection light L1 while diffusing it, so that the emission light L2 has the even luminance with the optical axis A2 as a center. Therefore, the projection-type image displaying device 100 is suitable as a screen for a head-up display.

(Method For Manufacturing Diffuser Plate)

Figure 4:
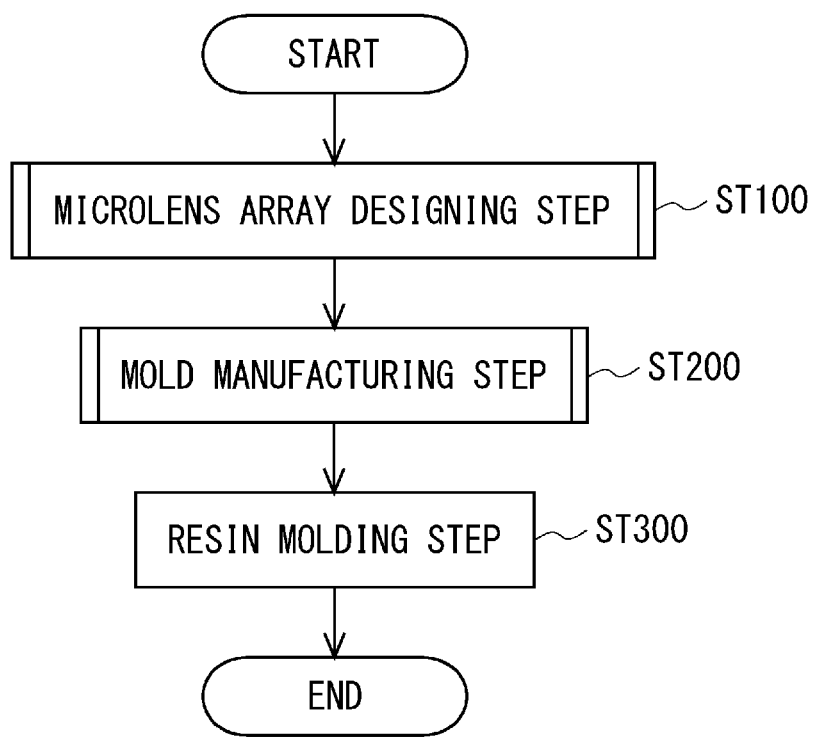
FIG. 4 is a flowchart showing a method for manufacturing a diffuser plate according to the first embodiment.
Figure 5:
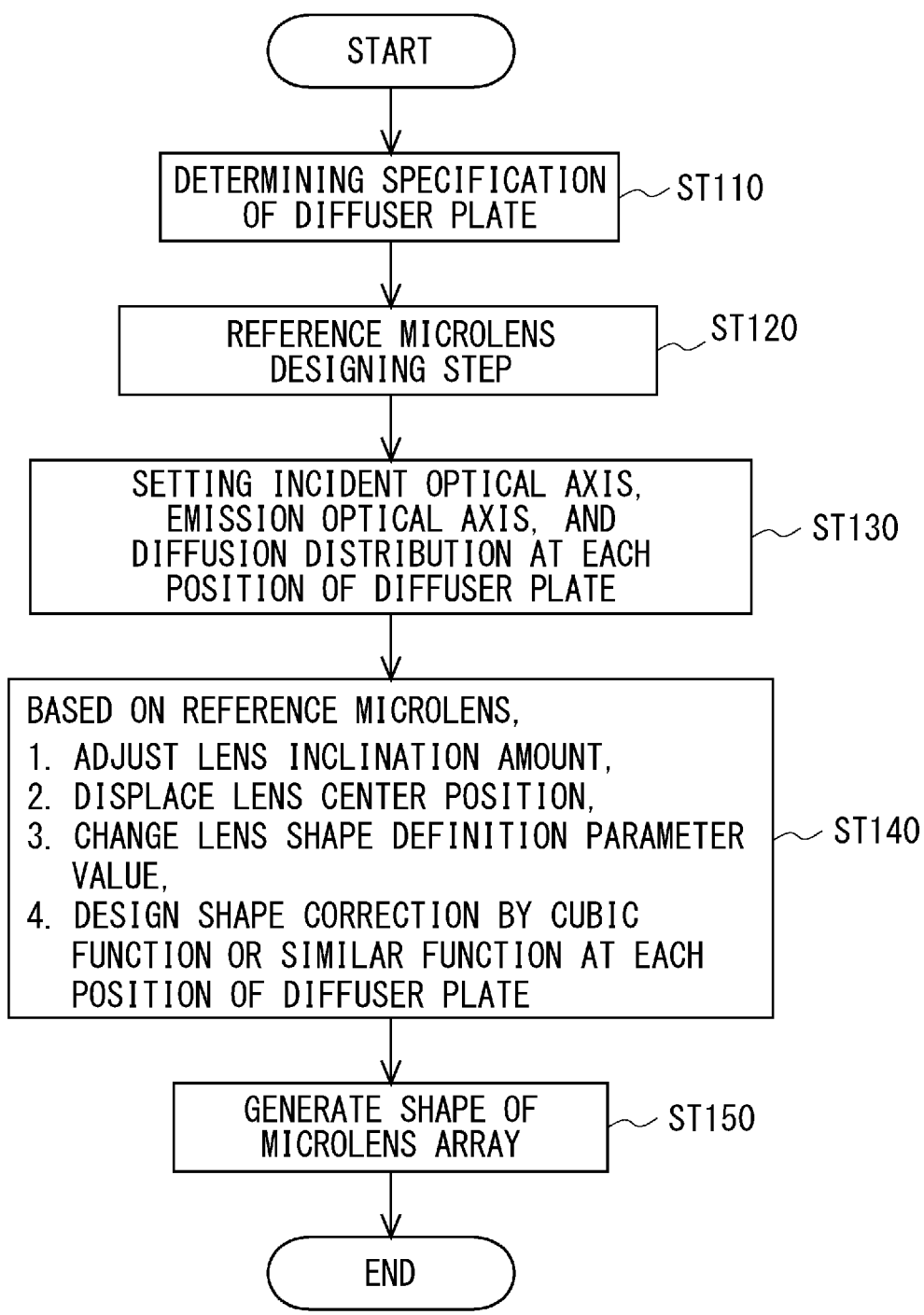
FIG. 5 is a flowchart showing a designing step of a microlens array according to the first embodiment.

With reference to FIG. 4 and FIG. 5, a method for manufacturing a diffuser plate according to the first embodiment will be explained. FIG. 4 is a flowchart showing steps of a method for manufacturing a diffuser plate. FIG. 5 is a flowchart showing a designing step of a microlens array according to the first embodiment.

As shown in FIG. 4, the method for manufacturing a diffuser plate includes a step (S100) for designing a microlens array that exhibits a desired light diffusion property, a step (S200) for manufacturing a mold of the microlens array, and a step (S300) for transferring a shape of the microlens array to a resin using the mold.

Each step will be explained in order as follows.

With reference to FIG. 5, the step (S100) of designing the microlens array will be explained. First, the specification of the diffuser plate is determined (ST110). Concretely, the specifications such as an optical physical property (in particular, a refractive index), used wavelength, and a required diffusion property of a material used for the diffuser plate are determined.

Then, a reference microlens is designed from the diffusion properties required for the diffuser plate, and the optical property of the material (ST120). The diffusion shape, for example, a top hat or Gaussian distribution may be set according to the light distribution properties required for the projection-type image displaying device, and an angle for enlarging the diffusion may further be set. In a reference microlens designing stage, the design may be executed based on the assumption that the light is incident substantially vertically on the lens main surface, and the emission light has the same optical axis. The reference microlens may be designed by optical line tracking and diffractive calculation, and may be separately used according to the need. The reference microlens may be designed by diffractive calculation, and the inclination coping lens can be designed using the optical line tracking. Both of the reference microlens and the inclination coping lens may be designed by the diffractive calculation, or using the optical line tracking. The present invention is explained using an optical line tracking method in both of the steps. In this Example, the optical line tracking is analyzed using a lighting design analyzing software LightTools (Registered Trademark).

Then, the microlens is designed based on a refractive index of the uneven pattern part of the diffuser plate, and the material and the refractive index of the base material film (reference microlens designing step ST120). The number of the reference microlens number may be one, and two or more according to the need. In particular, if the strength of diffractive light is higher when the lens size is 100 μm or less, two or more kinds, a random lens shape, and a shape for modulating a phase may be used. In the reference microlens designing stage, it may be considered that it is assumed that the same reference microlenses are uniformly provided entirely on the main surface of the substrate of the diffuser plate. The reference microlens has, for example, a toroidal shape or a biconical surface.

Then, the inclination of the optical axis of the incident light, the inclination of the optical axis of the emission light, and a required diffusion property are set at each position of the diffuser plate (light setting step ST130).

Then, it advances to an inclination coping lens designing step ST140 based on the designed reference microlens. In this step, the lens shape is designed at each position of the diffuser plate using the inclination of the optical axis of the incident light, the inclination of the optical axis of the emission light, and the setting of the required diffusion property at each position of the diffuser plate set in the light setting step ST130 as input data. The inclination coping lens may be designed by the optical line tracking or the diffractive calculation of all of the respective lenses, and the parameters may be changed by selecting lens parameters to be changed.

In a general diffuser plate including a microlens array, the number of the microlenses might exceed one million, and therefore, a lot of labors are required for individually designing respective lenses. Then, in the inclination coping lens designing step ST140, the curvature radius, a conical coefficient, a cubic correction coefficient, a lens center position displacement amount, and the lens inclination are selected as parameters of the lens to be designed. Then, for example, the inclination is coped by the above-mentioned parameter adjustment, at a portion in which the incident light is incident at a minimum angle, and a portion in which the incident light is incident at a maximum angle, so as to set upper and lower limits of the respective parameters. The designing of the respective lenses is omitted using an internal insertion method between them. The minimum angle is a minimum value of a crossed angle of the optical axis of the incident light and a virtual axis substantially vertical to the diffuser plate. The maximum angle is a maximum value of a crossed angle of the optical axis of the incident light and a virtual axis substantially vertical to the diffuser plate. The same designing effect can be obtained as when designing the inclination coping lens at each position of the entire surface of the diffuser plate based on the parameters limited by this method.

(Evenness of Diffusion Property of Emission Light)

Figure 6:
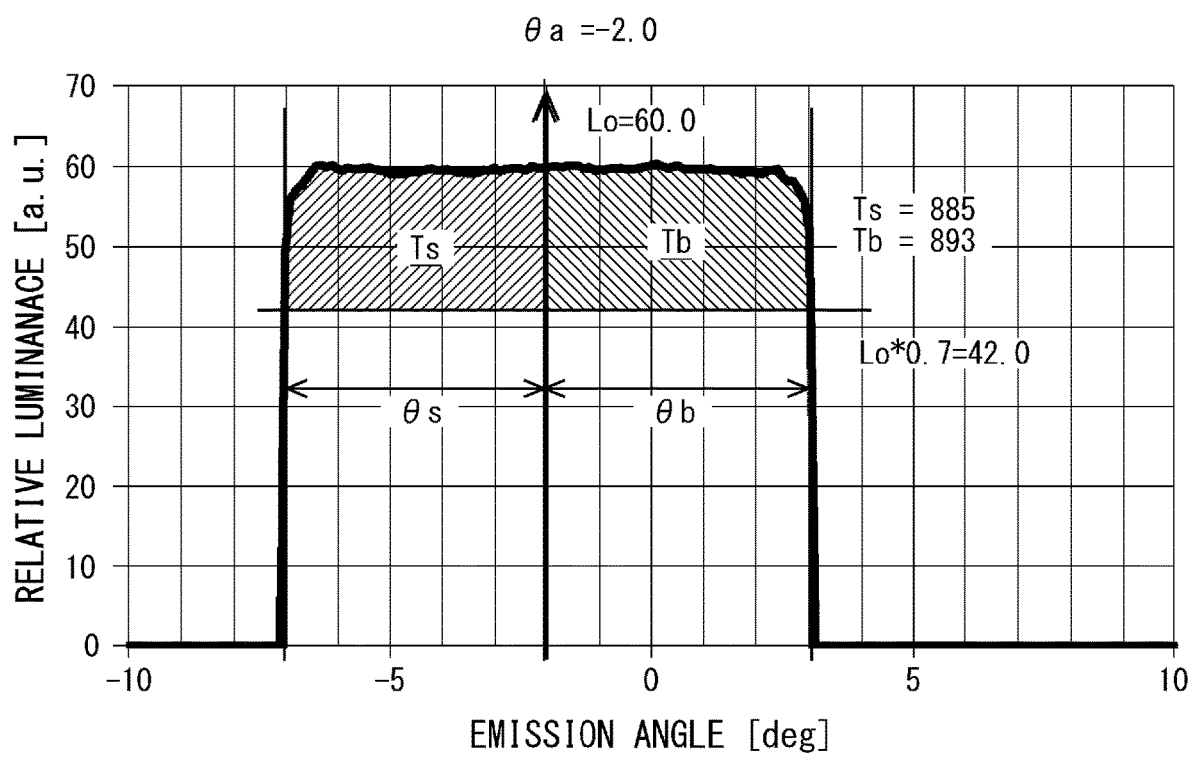
FIG. 6 is a view for explaining a method for evaluating evenness of a diffusion property of the emission light.
Figure 17:
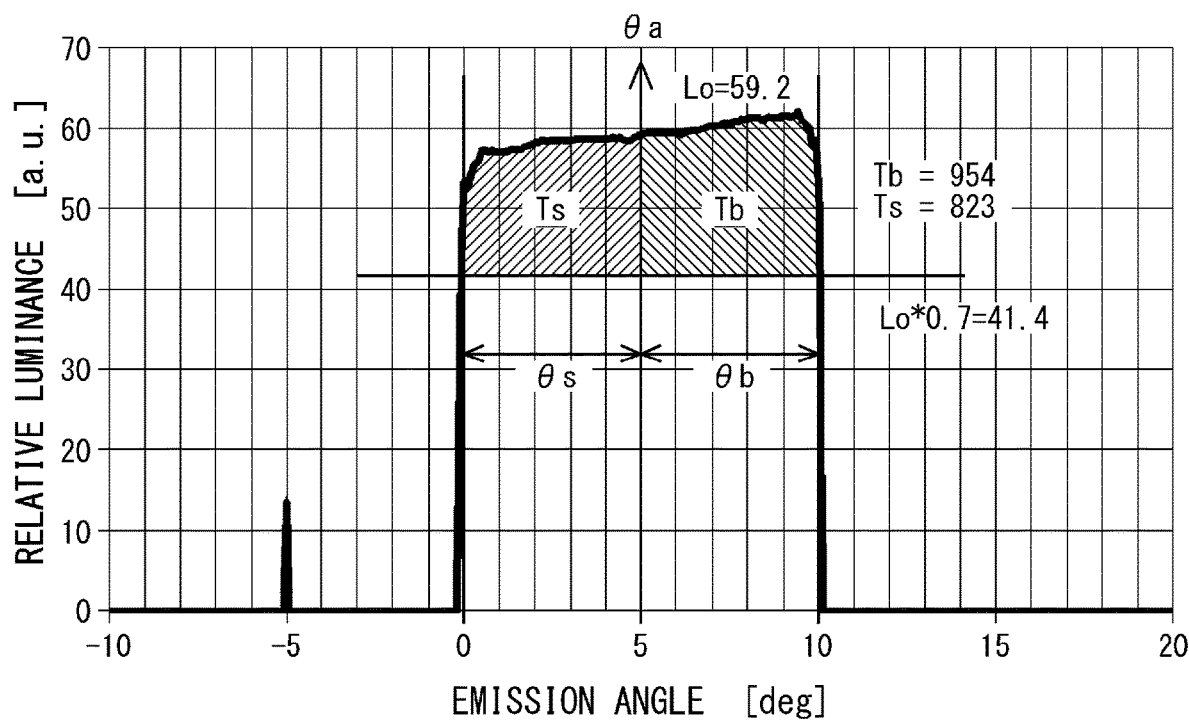
FIG. 17 is a view for explaining a method for evaluating evenness of a diffusion property of the emission light.

Then, a method for quantitatively evaluating evenness of the diffusion properties of the emission light is explained using FIG. 6 and FIG. 17. FIG. 6 and FIG. 17 are view for explaining a method for evaluating the evenness of the diffusion property of the emission light.

In the diffusion distribution of the emission light, there is a diffusion angle $\theta s$ corresponding to a luminance value corresponding to 70% of the optical axis luminance Lo in a region on the left side in FIG. 6 and FIG. 17, i.e., at an angle smaller than the optical axis diffusion angle $\theta a$, with the optical axis luminance Lo at the optical axis diffusion angle $\theta a$ corresponding to the position of the optical axis of the emission light as a reference. There is a diffusion angle $\theta b$ corresponding to a luminance value corresponding to 70% of the optical axis luminance Lo in a region on the right side in FIG. 6 and FIG. 17, i.e., at an angle larger than the optical axis diffusion angle $\theta a$. Then, in a range from the diffusion angle $\theta s$ to the diffusion angle $\theta b$, the optical axis luminance Lo is designated as a reference, then the optical axis luminance Lo×0.7 is subtracted from each luminance, and an integrated luminance Ts from the diffusion angle $\theta s$ to the optical axis diffusion angle $\theta a$ and an integrated luminance Tb from the optical axis diffusion angle $\theta a$ to the diffusion angle $\theta b$ are calculated. Then, an evenness evaluation index Ts/Tb that is a ratio of the integrated luminance Ts and the integrated luminance Tb is calculated, and the evenness of the diffusion property of the emission light is evaluated based on the evenness evaluation index Ts/Tb, and the diffusion range $\theta s+\theta b$ of the emission light.

Concretely, an allowable range D-1/D of the evenness evaluation index Ts/Tb is changed according to the width of the diffusion range $\theta s+\theta b$. Even when the evenness evaluation index Ts/Tb is the same value, if the diffusion range $\theta s+\theta b$ is narrow, the evenness of the diffusion property of the emission light tends to be visually recognized as low. To the contrary, if the diffusion range $\theta s+\theta b$ is wide, the evenness tends to be visually recognized as high. Based on this, the allowable range D-1/D of the evenness evaluation index is determined according to the diffusion range $\theta s+\theta b$ as follows. The lower limit value D of the evenness allowable range is expressed by the following expression.

$$D=0.63*\exp(0.45*((90-(\theta s+\theta b))/90)^2)$$

The evenness of the diffusion property of the emission light may be determined as sufficient, if a range of the evenness evaluation index Ts/Tb is in a following range, using the lower limit value D and the upper limit value 1/D of the evenness allowable range.

$$D<Ts/Tb<1/D$$

Concretely, when the diffusion range $\theta s+\theta b$ is 10 degrees, the lower limit value D of the evenness allowable range is 0.90, and the upper limit value 1/D thereof is 1.11. It is preferable that the evenness evaluation index Ts/Tb exceeds the lower limit value D of the evenness allowable range, 0.90, and the upper limit value 1/D thereof is less than 1.11 because the diffuser plate diffuses the emission light at the even diffusion distribution. It is preferable that, when the diffusion angle $\theta s+\theta b$ is 20 degrees, the evenness evaluation index Ts/Tb exceeds the lower limit value D of the evenness allowable range, 0.83, and the upper limit value 1/D thereof is less than 1.21 because the diffuser plate diffuses the emission light at the even diffusion distribution.

Concretely, in the example shown in FIG. 6, since the diffusion range θs+θb is 10 degrees, and the evenness evaluation index Ts/Tb is 0.99, it is in a range from the lower limit value D, 0.9 to the upper limit value 1/D, 1.11 of the evenness allowable range. That is to say, in the example shown in FIG. 6, the diffusion property of the emission light is recognized as even.

In the example shown in FIG. 17, the diffusion range θs+θb is 10 degrees, and the evenness evaluation index Ts/Tb is about 0.86, and therefore, it is below the lower limit value D of the evenness allowable range, 0.9. That is, in the example shown in FIG. 17, the diffusion property of the emission light is recognized as uneven.

(One Example of Effects of Invention)

According to the diffuser plate and the projection-type image displaying device according to the present invention, the diffusion property of the emission light can be made even regardless of the incident light, so that the corners of the image can be visually recognized clearly, and a high-quality image can be provided. By curving the optical axis of the emission light to the optical axis of the incident light, a diffuser plate having a function for enlarging an image range can be provided, the device can be made small, and a degree of freedom in designing the image displaying device can be improved.

EXAMPLES

With reference to one example of a method for manufacturing a diffuser plate according to the first embodiment, fabricated Examples 1 to 4 will now be explained. First, one example of the method for manufacturing the diffuser plate in the first embodiment will be explained.

(Common Design Items of Examples 1 to 4)

In the reference microlens designing step ST120, concretely, the shape of the reference microlens will be explained. A general rotation symmetrical shape may be used as a lens shape of the reference microlens. In this case, the cross sectional shape of the reference microlens, in particular, a sag amount z [µm] with a crossing point of the center of the reference microlens and the lens surface as a reference is expressed by the following expression 2. Here, C is a curvature [1/µm], K is a conical coefficient, and r is a distance [µm] from the center. The curvature C is expressed as C=1/R using a curvature radius R [µm].

[Expression 2]

$$z = \frac{-Cr^2}{1 + \sqrt{1 - (K+1)C^2r^2}} \quad \text{(expression 2)}$$

The cross sectional shape of the reference microlens used for the diffuser plate in this Example is expressed by the following expression 3. Here, the reference microlens is a toroidal lens having a rectangular bottom surface. Each position of the reference microlens is defined using an XYZ three-dimensional coordinate. Concretely, the bottom surface is along an XY plane, and a virtual axis substantially vertical to the bottom surface is designated as Z. The curvature of a lens convex surface of each reference microlens is defined in an X-direction and a Y-direction. Here, using a center of the reference microlens as the origin, a relationship between an X-direction distance $r_x$ from an center axis of the reference microlens, a Y-direction distance $r_y$ from the center axis of the reference microlens, a curvature $C_x$[1/µm] in the X-direction (XZ plane), a curvature $C_y$[1/µm] in the Y-direction, a conical coefficient $K_x$ in the X-direction (XZ plane), and a conical coefficient $K_y$ in the Y-direction (YZ plane) can be expressed by the expression 3. Also, in the diagonal incident coping design, as shown in the expression 3, a cubic function correction expression having cubic function correction coefficients Ax, Ay is added.

[Expression 3]

$$z = \frac{-Cr_x^2}{1 + \sqrt{1 - \frac{1}{(K_x+1)C^2r_x^2}}} + \quad \text{(expression 3)}$$

$$\frac{-Cr_y^2}{1 + \sqrt{1 - \frac{1}{(K_y+1)C^2r_y^2}}} + A_x r_x^3 + A_y r_y^3$$

(Input Items in First to Fourth Embodiments and Common Design Items)

Then, the input items and the common design items in Examples 1 to 4 will be explained. The refractive index of a pattern portion of the diffuser plate is 1.52, and the refractive index of a base material is 1.59, using polycarbonate as a base material of the diffuser plate. In the diffusion property of the emission light emitted from the diffuser plate, the diffusion shape is rectangle. Furthermore, in the horizontal direction H (for example, a direction along an outer edge of a long side of the diffuser plate 10 shown in FIG. 1), the total diffusion angle of the emission light is 20 degrees, and in the vertical direction V (for example, a direction along an outer edge of a short side of the diffuser plate 10 shown in FIG. 1), the total diffusion angle of the emission light is 10 degrees.

Also, the light distribution shape in each direction is made similar to the shape of a top hat. The image from the projection device is incident on a fine uneven surface of the diffuser plate (a pattern surface, in particular, a microlens array, and in more particular, a microlens 2 shown in FIG. 2), and emitted as the image light is diffused from a flat surface of a base material surface (for example, a main surface 1*b* shown in FIG. 2).

Figure 7:
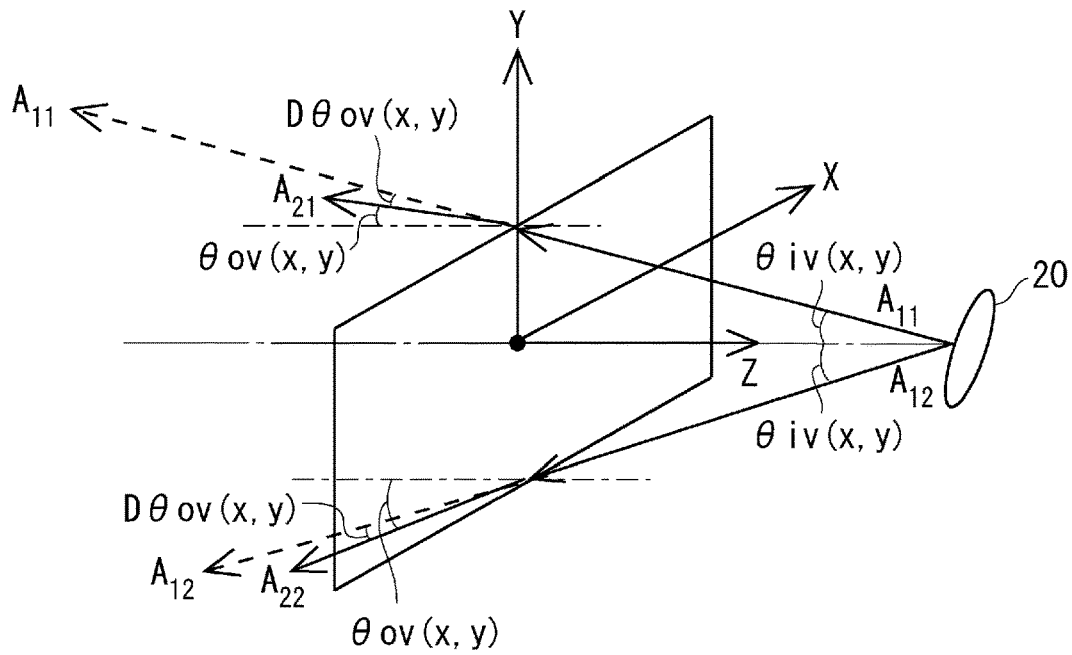
FIG. 7 is a view for explaining a definition of an incident angle in a vertical direction.
Figure 8:
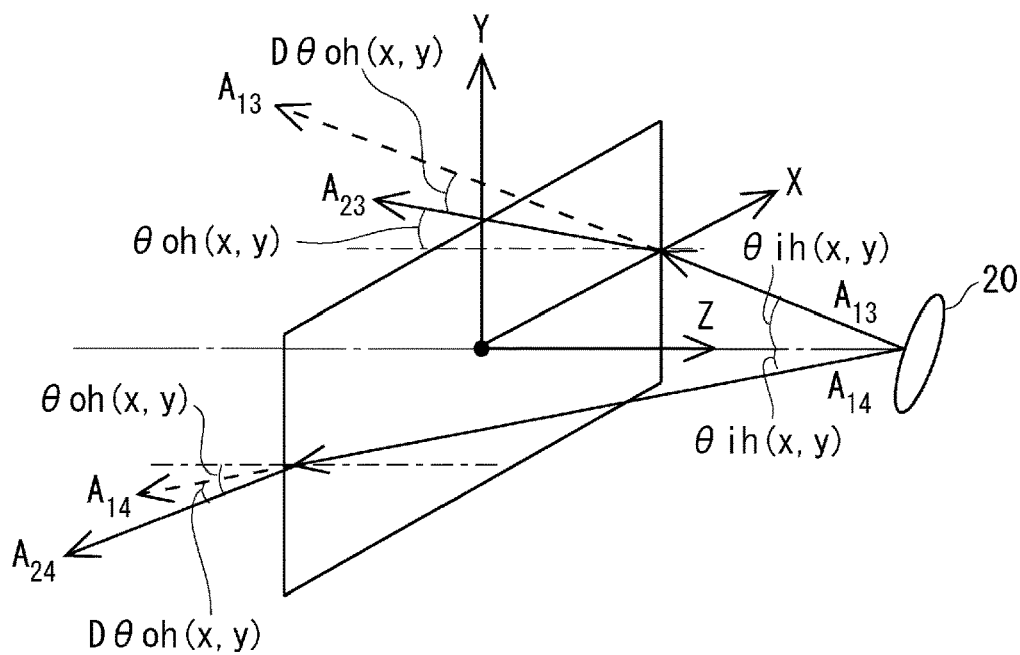
FIG. 8 is a view for explaining a definition of an incident angle in a horizontal direction.

There is one example of the diffuser plate 10 shown in FIG. 1. This example relates to a rectangular-like plate, and length $H_L$ of a long side in the horizontal direction H is 60 mm (±30 mm), and length $V_L$ of the long side in the vertical direction V is 30 mm (±15 mm). In this example, when the projection light is projected, optical line contained in the projection light is vertically incident on a portion corresponding to the origin of this example of the diffuser plate. As shown in FIG. 7, the optical line inclined by ±5 degrees is incident at both ends in this example of the diffuser plate in the vertical direction V. As shown in FIG. 8, the optical line inclined by ±10 degrees is incident at both ends in this example of the diffuser plate in the horizontal direction H. As shown in FIG. 7 and FIG. 8, optical axis angles of the incident light in x, y axial directions at each position of the reference microlens are respectively designated as θih (x,y), θiv (x,y). Also, optical axis angles in the emission direction are designated as θoh (x,y), θov (x,y). Here, the respective angles are expressed as functions of places. The displacements of the optical axis of the emission light from the incident optical axis are respectively designated as Dθoh (x,y), Dθov (x,y) in the x, y axial directions.

Based on such information, the reference microlens was designed under a condition that the projection light is incident vertically (in this case, θih=0, θiv=0). Various conditions of the reference microlens are set as a horizontal pitch Px30 [μm], a curvature radius Rx44.6 [μm], a conical coefficient kx−0.75, a vertical pitch Py30 [μm], a curvature radius Ry89.3 [μm], and a conical coefficient ky−0.75. The horizontal pitch Px is a distance between boundaries of the adjacent reference microlenses. The vertical pitch Py is a distance between boundaries of the adjacent reference microlenses.

Then, in the inclination coping lens design, as parameters for coping with each inclination, at each position of the XY coordinate, the displacement amounts of the lens center position are designated as Dh, Dv [μm], the lens curvature radius coefficients are designated as αx, αy, and the cubic function correction coefficients are designated as Ax, Ay.

Figure 9A:
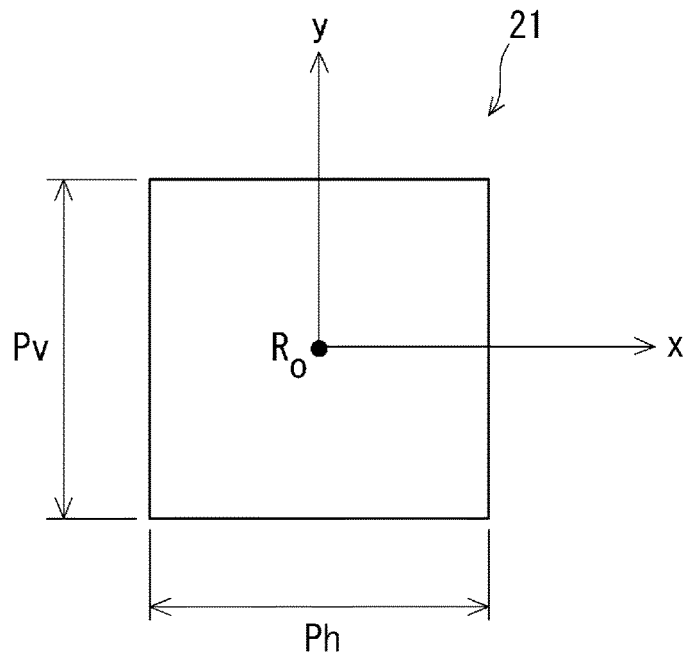
FIG. 9A is a view showing a reference microlens according to a microlens of the diffuser plate according to the first embodiment.
Figure 9B:
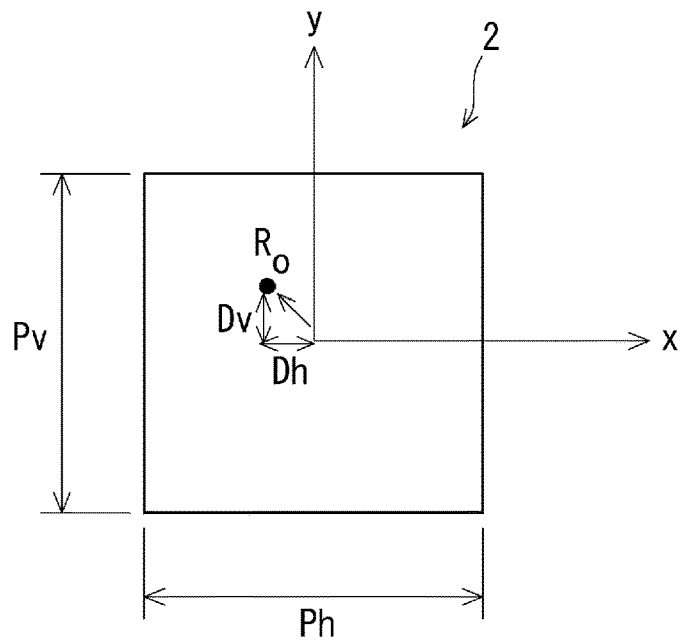
FIG. 9B is a view showing the microlens of the diffuser plate according to the first embodiment.

At a certain position of the XY coordinate, a center position Ro of the microlens 2 shown in FIG. 9B is displaced by a predetermined distance from a center position Ro of the reference microlens 21 shown in FIG. 9A. Concretely, the center position Ro of the microlens 2 is displaced by a distance Dh in the X-direction and by a distance Dv in the Y-direction, from the center position Ro of the reference microlens 21. That is to say, the displacement amount Dh of the lens center position in the X-direction is a distance in the X-direction from the center position Ro of the reference microlens 21 to the center position Ro of the microlens 2. The displacement amount Dv of the lens center position in the Y-direction is a distance in the Y-direction from the center position Ro of the reference microlens 21 to the center position Ro of the microlens 2.

Example 1

The condition of the emission light of the diffuser plate is determined based on the above-mentioned common design items. All of the optical axes of the emission light of the diffuser plate are inclined to the optical axis of each incident light by −2 degrees in the vertical direction V (here, Dθov=−2 deg). Other diffusion properties are the same as above.

Here, the optical axis of the diffuser plate is curved only in the vertical direction V, and therefore, the lens may be designed only in the cross section in the vertical direction (V cross section). To execute the inclination coping lens design effective to an entire region in the vertical direction V, parameters are designed at respective positions V1, V2, V3 on a straight line extending in the vertical direction V. When using an XY orthogonal coordinate, a position V1 (0 mm, 0 mm), a position V2 (0 mm, +15 mm), and a position V3 (0 mm, −15 mm) are expressed.

Figure 10:
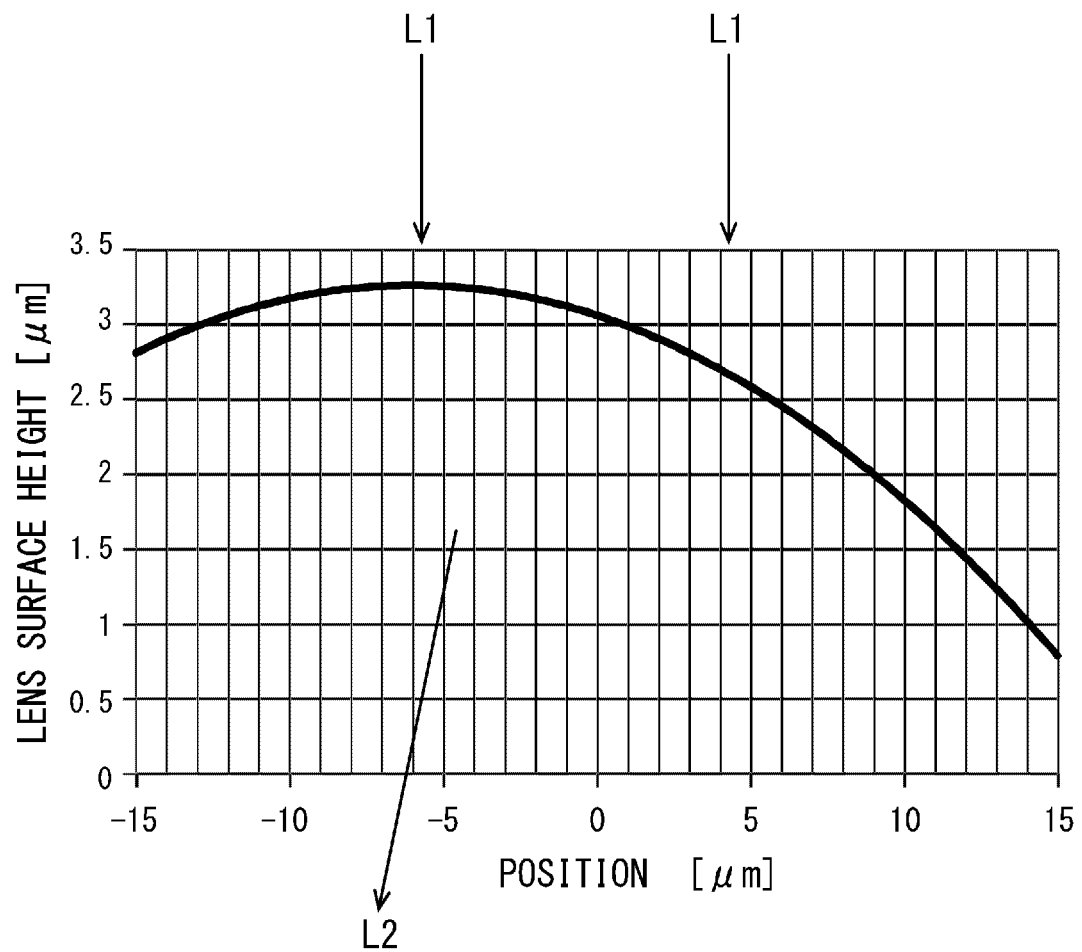
FIG. 10 is a graph showing height of a lens surface at each position of the microlens of the diffuser plate.

First, at the position V1 (0 mm, 0 mm), as the light distribution properties, an angle of the optical axis of the incident light to the main surface of the lens substrate in the vertical direction V is 0 [deg], an angle of the emission optical axis to the main surface of the lens substrate is −2 [deg], and emission light distribution angle may be in a range of −7 to +3 [deg]. To realize this, the displacement amount Dv at the lens center position is −6 [μm]. FIG. 10 shows a cross sectional shape of the microlens at the position V1 in this design. Also, FIG. 6 shows the light distribution property in the vertical direction V. FIG. 10 indicates an arrow showing a direction in which the projection light L1 and the emission light L2 advance. In the below-described FIG. 11, and FIG. 13, as is similar to FIG. 10, this arrow is indicated. Here, the diffusion range θs+θb is 10 degrees, and so, when an evenness evaluation index Ts/Tb is greater than 0.90 that is a lower limit value D of the evenness allowable range and less than 1.11 that is an upper limit value 1/D thereof, the diffusion distribution of the emission light is even. The evenness evaluation index Ts/Tb is 0.99, exceeds the lower limit value D of the evenness allowable range, and is less than the upper limit value 1/D thereof, so that the distribution is even.

Figure 11:
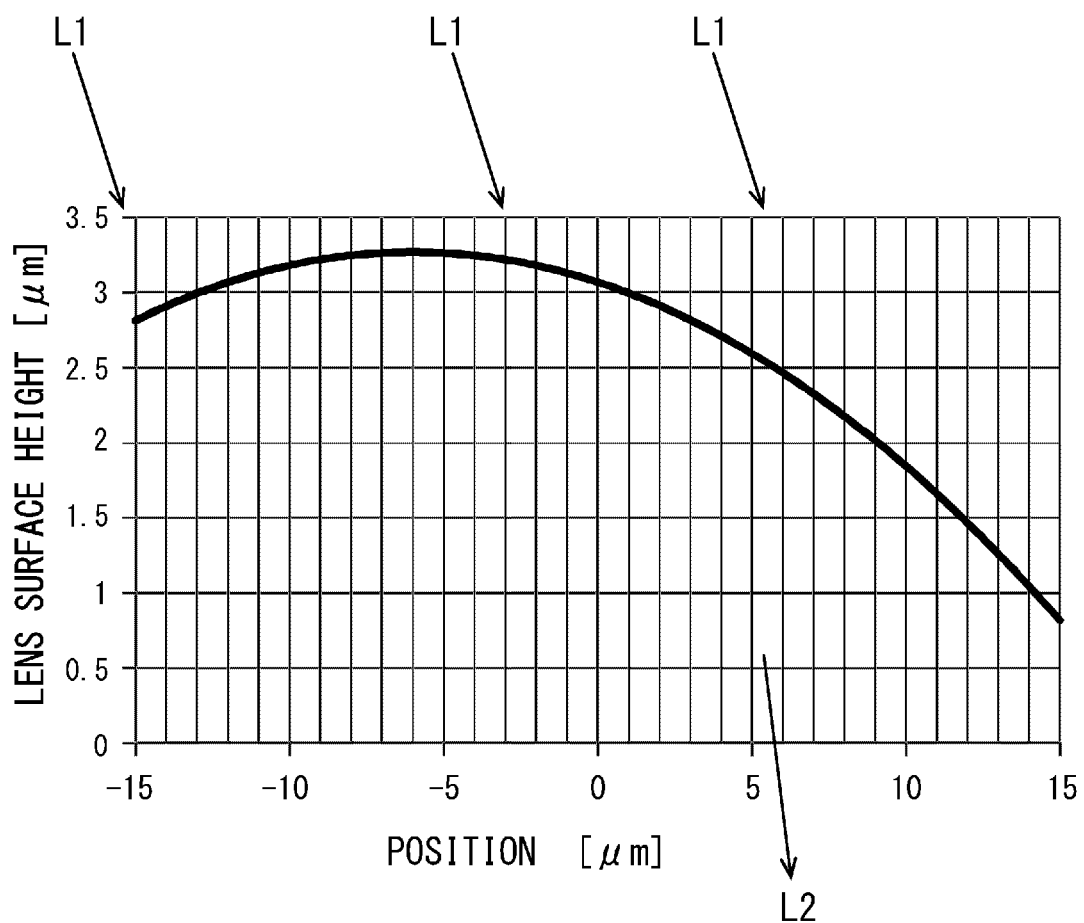
FIG. 11 is a graph showing height of a lens surface at each position of the microlens of the diffuser plate.
Figure 12:
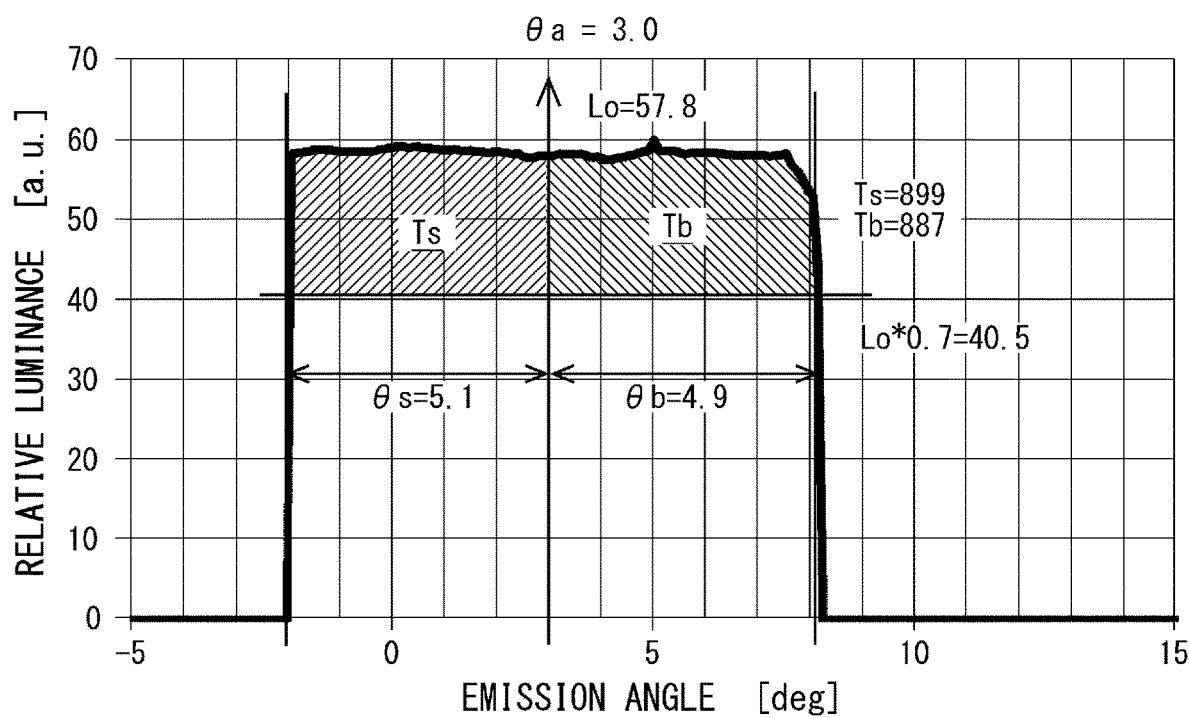
FIG. 12 is a graph showing luminance to the diffusion angle of the emission light.

Then, at the position V2 (0 mm, +15 mm), in the vertical direction V, the angle of the optical axis of the incident light to the main surface of the lens substrate is 5 [deg], the angle of the optical axis of the emission light to the main surface of the lens substrate may be 3 [deg](=5 [deg]−2 [deg]), and the emission light distribution angle may be −2 to +8 [deg]. As a design for realizing this, the displacement amount of the lens center position in the Y-direction is Dv=−6 [μm], the lens curvature radius coefficient in the Y-direction is αy=1−0.01, i.e., 0.99, and the cubic function correction amount in the Y-direction is Ay=0.02/15^3(=5.926E−06). The cross sectional shape of the microlens at the position V2 in this design is shown in FIG. 11. The light distribution property in the vertical direction V is shown in FIG. 12. Also, the evenness evaluation index Ts/Tb is 1.01, exceeds the lower limit value D of the evenness allowable range, and is less than the upper limit value 1/D thereof, so that the evenness is realized.

Figure 13:
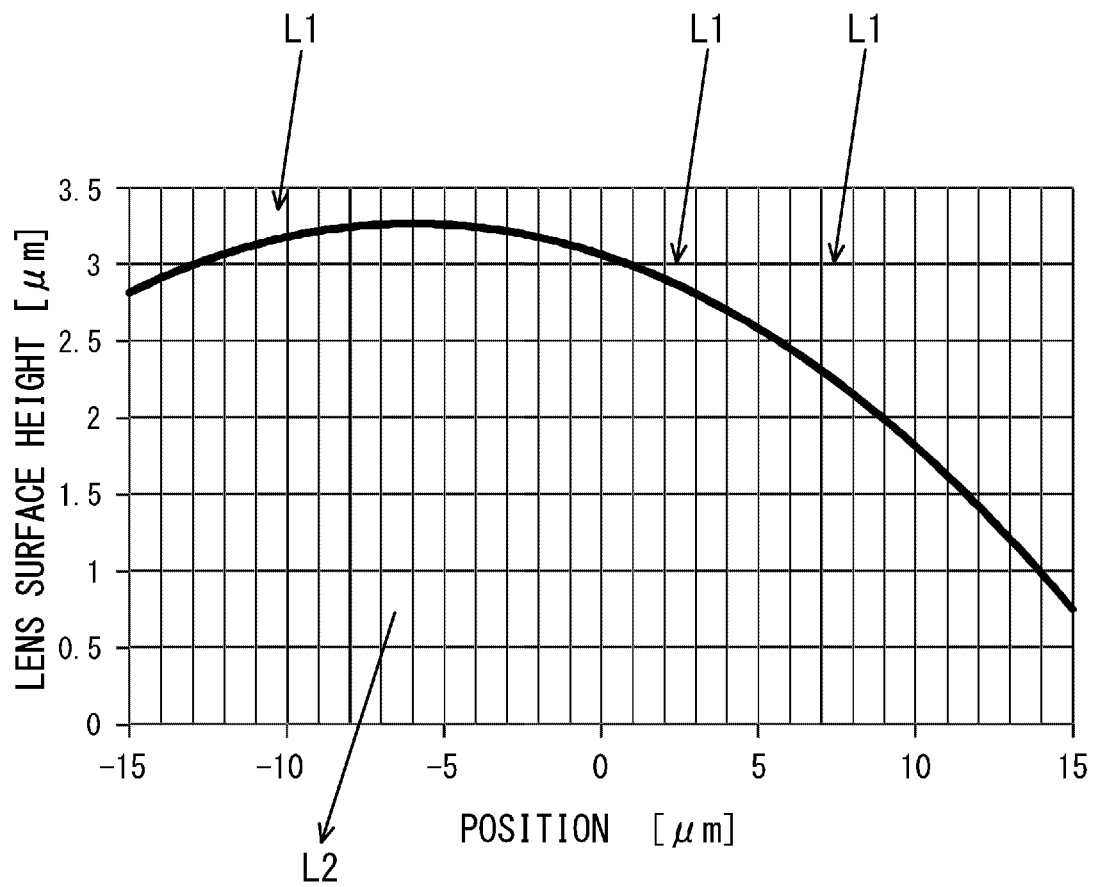
FIG. 13 is a graph showing height of the lens surface at each position of the microlens of the diffuser plate.
Figure 14:
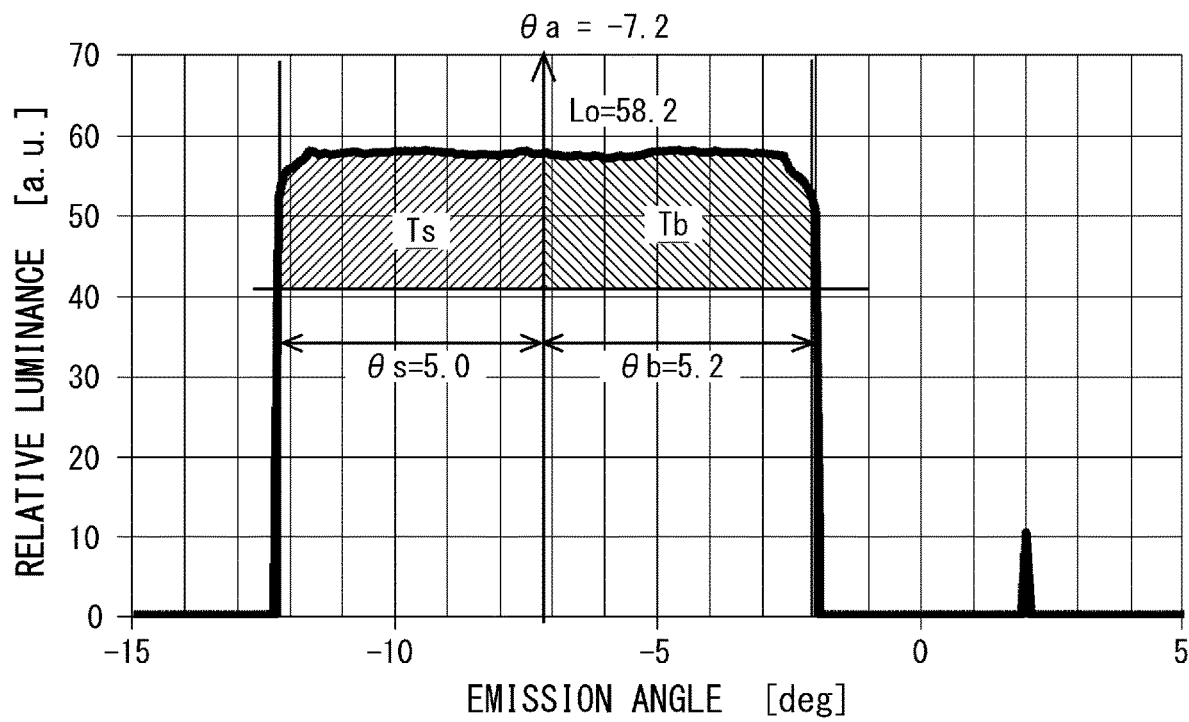
FIG. 14 is a graph showing luminance to the diffusion angle of the emission light.

Then, designing is executed at the position V3 (0 mm, −15 mm). In the vertical direction V, the angle of the optical axis of the incident light to the main surface of the lens substrate may be −5 [deg], the angle of the optical axis of the emission light to the main surface of the lens substrate may be −7 [deg](=−5 [deg]−2 [deg]), and the emission light distribution angle may be −12 to −2 [deg]. As a design for realizing this, the displacement amount of the lens center in the Y-direction is Dv=−6 [μm], the lens curvature radius coefficient is αy=1+0.01, i.e., 1.01, and the cubic function correction amount is Ay=−0.02/15 3(=5.926E−06). The cross sectional shape of the microlens at the position V3 in this design is shown in FIG. 13. The light distribution property in the vertical direction V is shown in FIG. 14. Also, the evenness evaluation index Ts/Tb is 0.98, exceeds the lower limit value D of the evenness allowable range, and is less than the upper limit value 1/D thereof, so that the evenness is realized.

According to design values at three positions V1 to V3, each parameter, a cubic function correction amount Ay, and a lens curvature radius coefficient αy at each position of the Y-coordinate are expressed by the following expression.

$$Ay = 0.02/(15^3) \times (Y/15)$$

$$\alpha y = 1 - 0.01 \times (Y/15)$$

Thereby, a desired emission light property can be obtained by applying the above-mentioned design at an arbitrary position on the Y-coordinate in the diffuser plate.

Example 2

Conditions are added to the emission light of the diffuser plate, based on the above-mentioned common design items. All of the optical axes of the emission light of the diffuser plate are set to be inclined to the optical axis of each incident light by −3 deg in the horizontal direction H (here, DӨoh=−3 deg). Other diffusion properties are set to the same condition as Example 1. Each parameter at each position of the X-coordinate, the displacement amount Dh of the lens center position, the lens curvature radius coefficient αx, and the cubic function correction coefficient Ax are expressed by the following expression.

$$Dh=-4.45-0.1\times(X/30)$$

$$\alpha x=1-0.02\times|(X/30)|(X\geq 0)$$

$$\alpha x=1+0.05\times|(X/30)|(X<0)$$

$$Ax=0.15/(15^{\wedge}3)\times(X/30)$$

The evenness evaluation index Ts/Tb is 1.03 at the position of X=−30 mm, and 1.00 at the position of X=+30 mm, and therefore, the evenness is realized.

Thereby, a desired light distribution property of the emission light can be obtained by applying the above-mentioned design at an arbitrary position in the X-coordinate in the diffuser plate.

Example 3

When the designs in Example 1 and Example 2 are applied to the cross sectional shape along the vertical direction V or the horizontal direction H at the same time, the optical axis of the emission light can be curved to the optical axis of the incident light by −2 [deg] in the vertical direction V, and by −3 [deg] in the horizontal direction H, at the same time. In this manner, a design that the optical axis of the emission light is curved in a two-dimensional direction can be executed.

Example 4

In Example 1, a constant change of the optical axis of the emission light is given to the optical axis of the incident light. In Example 4, in a range from an Y-coordinate position, −15 mm to +15 mm in the diffuser plate surface in the vertical direction V, under a condition that the incident angle Өiv of the incident light varies from −5 deg to +5 deg, the optical axis of the emission light is changed by the emission angle DӨov [deg] in the Y-direction to the optical axis of the incident light at each Y position. That is to say, the optical axis is continuously varied along the Y-direction. The maximum change of the incident optical axis is 2 deg, and the expression, DӨov=2*Y/15 [deg] is satisfied.

When the emission angle Өov [deg] in the Y-direction is defined, the emission angle Өov at each Y-position is expressed by the following expression.

$$\theta ov=\theta iv+D\theta ov$$

As is similar to Example 1, a target property can be obtained by the following parameter in executing the design at three points of the diffuser plate according to Example 4. The displacement amount Dv of the lens center, and the cubic function correction amount Ay are set so that they are expressed by the following expression.

$$Dv=-6.0*Y/15$$

$$Ay=-0.02/15^{\wedge}3(=5.926E-06)*Y/15$$

$$\alpha x=1+0.02\times|(Y/15)|$$

The evenness evaluation index Ts/Tb is 0.98 at the position of Y=−15 mm, and 0.98 at the position of Y=+15 mm, so the evenness is realized. Thereby, while changing the optical axis at each position, the width of the light distribution property can be almost fixed, the strength distribution can be flat, and the cross sectional shape of the light distribution property can be maintained.

COMPARATIVE EXAMPLES

Then, Comparative Examples 1 and 2 will be explained.

In the Comparative Example 1, a diffuser plate having a reference microlens with the same configuration as that of the reference microlens of the microlens array of the diffuser plate used in Example 1 is used. FIG. 17 shows a light distribution property when the light inclined to 5 degrees is incident on the diffuser plate. The optical axis Өa of the emission light is 5 deg, the diffusion range Өs+Өb is 10 deg, and the allowable range D-1/D of the evenness evaluation index Ts/Tb is greater than 0.90 and less than 1.11. However, the evenness evaluation index Ts/Tb is 0.86 and is not included in the allowable range D-1/D, and therefore, it is determined that the evenness is not sufficient. In this manner, in the diffuser plate having a conventional microlens array, when the light is diagonally incident, the optical axis is almost the same as that of the incident light, and the light distribution is inclined, so as to cause uneven luminance.

Figure 15:
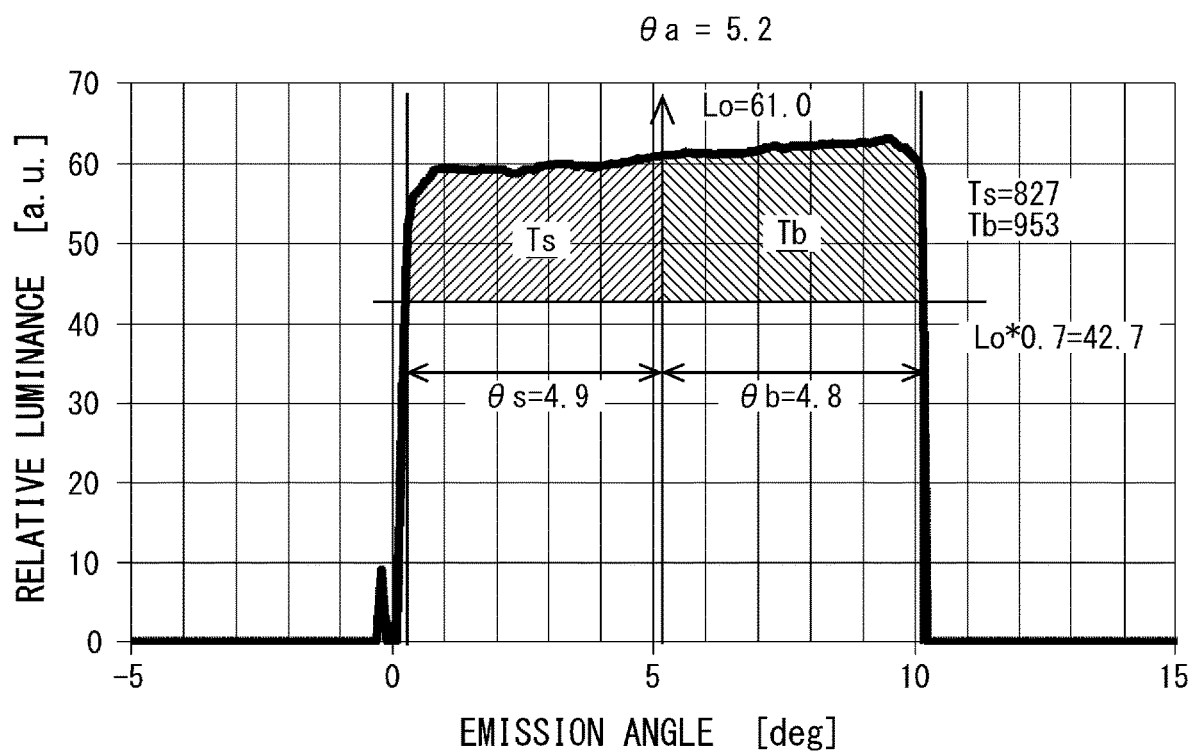
FIG. 15 is a graph showing luminance to the diffusion angle of the emission light.

In the Comparative Example 2, a diffuser plate having an inclination lens formed by inclining the reference microlens itself with the same configuration as the reference microlens of the microlens array of the diffuser plate used in Example 1 by 10 degrees, is used. The inclination lens has the same shape as the shape inclined by 10 degrees by simply changing the reference lens shape by y*tan (10 deg). FIG. 15 shows the light distribution property at that time. The optical axis of the emission light is Өa=5.2 deg, the diffusion range Өs+Өb is 9.7 deg, and the allowable range D-1/D of the evenness evaluation index Ts/Tb is greater than 0.90 and less than 1.11. However, the evenness evaluation index Ts/Tb is 0.87, and is not included in the allowable range D-1/D, and therefore, it is determined that the evenness is not sufficient.

When the diffuser plate is inclined and the light is incident vertically, the optical axis of the emission light can be curved, however, the light distribution of the emission light is inclined, so as to cause uneven luminance.

The present invention is not limited to the above-mentioned embodiments, and can be appropriately changed within a range not departing from the scope of the invention. For example, the diffuser plate 10 according to the first embodiment is a transmissive diffuser plate, and may be a reflective diffuser plate. Concretely, the reflective diffuser plate comprises a main surface to which the projection light is projected and that reflects the reflection light, and a fine structure having a mirror function on the main surface. Also, the fine structure whose numerical aperture NA of the projection light is greater than 0 and 0.140 or less comprises a plurality of microlens shaped mirror parts having a microlens-like shape. An incident angle Өi formed by the optical axis of the projection light at the microlens shaped mirror part and a normal of the main surface intersecting with each other is in a range of 0-50 degrees. At least one of the plurality of microlens shaped mirror parts reflects the reflection light at a reflection angle formed by the optical axis of the reflection light at the microlens shaped mirror part and the normal of the main surface intersecting with each other. The reflection light is different from the incident angle Өi. The reflection light has substantially even luminance in the range of a desired diffusion angle. In the cross section substantially vertical to the microlens reference surface of the microlens shaped mirror part, the cross sectional shape of the microlens shaped mirror part has an asymmetrical cross sectional shape around the optical axis of the projection light.

In the above-mentioned reflective diffuser plate, the incident angle θi formed by the optical axis of the projection light at the microlens shaped mirror part and the normal of the main surface intersecting with each other is greater than 0 degrees and 50 degrees or less, and the reflection light may be the same as the incident angle θi.

Also, the microlens shaped mirror part may be designed using the above-mentioned method for designing the diffuser plate 10.

The present application is based upon and claims the benefit of priority of Japanese Patent Application No. 2016-195461, filed on Oct. 3, 2016, disclosure of which is incorporated herein in its entirety.

REFERENCE SIGNS LIST

10 diffuser plate
1 substrate
1a, 1b main surface
2 microlens
100 projection-type image displaying device
20 projection device
A0 axis
A1, A2 optical axis
Ax cubic function correction coefficient
Dh, Dv displacement amount of lens center position
H horizontal direction
L1 projection light
L2 emission light
Lb, Ls luminance
Lo optical axis luminance
Rd diffusion range
Ro center position
Ta, Tb, To, Ts integrated value
V vertical direction
V1-V3 position
αx, αy lens curvature radius coefficient
θb, θs diffusion angle
θi incident angle
θa optical axis diffusion angle
θo, θoy emission angle
θv optical axis displacement angle

What is claimed is:

1. A diffuser plate, comprising:
a projection side main surface to which projection light is projected;
an emission side main surface for emitting emission light; and
a fine structure having a lens function on at least one of the projection side main surface and the emission side main surface, wherein
a numerical aperture NA of the projection light is greater than 0 and 0.140 or less,
the fine structure has a plurality of microlens shape parts,
an incident angle Θi formed by an optical axis of the projection light at the microlens shape part and a normal axis of the projection side main surface intersecting with each other is in a range from 0 to 50 degrees,
at least one of the plurality of microlens shape parts emits the emission light at an emission angle Θo formed by an optical axis of the emission light at the microlens shape part and the normal of the projection side main surface intersecting with each other,
the emission angle Θo is different from the incident angle Θi,
the optical axis of the emission light is different than the normal axis of the projection side main surface, and
the emission light has even luminance in a predetermined diffusion angle range, and a cross sectional shape of the microlens shape part in a height direction of the microlens shape part from a microlens reference surface of the microlens shape part to an upper surface of the microlens shape part has an asymmetrical cross sectional shape around the optical axis of the projection light.

2. The diffuser plate according to claim 1, wherein
in a measurement luminance distribution to a diffusion angle, when a diffusion angle corresponding to a position of the optical axis of the emission light is designated as an optical axis diffusion angle Θa, an integrated value To of a measurement luminance from a minimum angle Θmin in a predetermined range of the diffusion angle to the optical axis diffusion angle Θa is 50% of an integrated value Ta of the measurement luminance in an entire range of the diffusion angle, an absolute value of a difference of an angle formed by the optical axis of the projection light and the optical axis of the emission light intersecting with each other varies within 0-40 degrees, a luminance Ls at a predetermined diffusion angle Θs and a luminance Lb at a predetermined diffusion angle Θb respectively correspond to 70% of an optical axis luminance Lo at the optical axis of the emission light, and
when the predetermined diffusion angle Θs is smaller than the optical axis diffusion angle Θa and the predetermined diffusion angle Θb is larger than the optical axis diffusion angle Θa, an evenness evaluation index Ts/Tb that is a ratio of an integrated value Ts of a luminance obtained by subtracting Lo*0.7 from each luminance from the predetermined diffusion angle Θs to the optical axis diffusion angle Θa and an integrated value Tb of a luminance from the optical axis diffusion angle Θa to the predetermined diffusion angle Θb satisfies D<Ts/Tb<1/D, and a lower limit value D of an allowable range of the evenness evaluation index Ts/Tb satisfies D=0.63*exp(0.45*((90−(Θs+Θb))/90)^2).

3. The diffuser plate according to claim 1, wherein
a bottom surface shape of the microlens shape part is rectangular, and
the microlens shape parts are periodically arranged in a lattice manner.

4. The diffuser plate according to claim 1, wherein a height H1 [μm] from a deepest part to an uppermost part of the microlens shape part satisfies: 0<H1≤75.

5. A projection-type image displaying device, comprising:
the diffuser plate according to claim 1; and
a projection device for projecting the projection light to the diffuser plate.

6. A diffuser plate, comprising:
a projection side main surface to which projection light is projected;
an emission side main surface for emitting emission light; and
a fine structure having a lens function on at least one of the projection side main surface and the emission side main surface, wherein
a numerical aperture NA of the projection light is greater than 0 and 0.140 or less, the fine structure has a plurality of microlens shape parts,
an incident angle Θi formed by an optical axis of the projection light at the microlens shape part and a normal axis of the projection side main surface intersecting with each other is greater than 0 degrees and 50 degrees or less,
at least one of the plurality of microlens shape parts emits the emission light at an emission angle Θo formed by an optical axis of the emission light at the microlens shape part and the normal of the projection side main surface intersecting with each other,
the emission angle Θo is the same as the incident angle Θi,
the optical axis of the emission light is different than the normal axis of the projection side main surface, and
the emission light has even luminance in a predetermined diffusion angle range, and a cross sectional shape of the microlens shape part in a height direction of the microlens shape part from a microlens reference surface of the microlens shape part to an upper surface of the microlens shape part has an asymmetrical cross sectional shape around the optical axis of the projection light.

7. The diffuser plate according to claim 6, wherein
in a measurement luminance distribution to a diffusion angle, when a diffusion angle corresponding to a position of the optical axis of the emission light is designated as an optical axis diffusion angle Θa, an integrated value To of a measurement luminance from a minimum angle Θmin in a predetermined range of the diffusion angle to the optical axis diffusion angle Θa is 50% of an integrated value Ta of the measurement luminance in an entire range of the diffusion angle, an absolute value of a difference of an angle formed by the optical axis of the projection light and the optical axis of the emission light intersecting with each other varies within 0-40 degrees, a luminance Ls at a predetermined diffusion angle Θs and a luminance Lb at a predetermined diffusion angle Θb respectively correspond to 70% of an optical axis luminance Lo at the optical axis of the emission light, and
when the predetermined diffusion angle Θs is smaller than the optical axis diffusion angle Θa and the predetermined diffusion angle Θb is larger than the optical axis diffusion angle Θa, an evenness evaluation index Ts/Tb that is a ratio of an integrated value Ts of a luminance obtained by subtracting Lo*0.7 from each luminance from the predetermined diffusion angle Θs to the optical axis diffusion angle Θa and an integrated value Tb of a luminance from the optical axis diffusion angle Θa to the predetermined diffusion angle Θb satisfies D<Ts/Tb<1/D, and a lower limit value D of an allowable range of the evenness evaluation index Ts/Tb satisfies D=0.63*exp(0.45*((90−(Θs+Θb))/90)^2).

8. The diffuser plate according to claim 6, wherein
a bottom surface shape of the microlens shape part is rectangular, and
the microlens shape parts are periodically arranged in a lattice manner.

9. The diffuser plate according to claim 6, wherein a height H1 [μm] from a deepest part to an uppermost part of the microlens shape part satisfies: 0<H1≤75.

10. A projection-type image displaying device comprising:
the diffuser plate according to claim 6; and
a projection device for projecting the projection light to the diffuser plate.

11. A method for designing a diffuser plate comprising a projection side main surface to which projection light is projected, and an emission side main surface for emitting emission light, the method comprising:
preparing a reference microlens so that a predetermined light diffusion property is achieved when light is projected along a normal axis of the projection side main surface of the diffuser plate, and
designing an inclination coping lens at a plurality of positions on the diffuser plate based on a shape of the reference microlens, an inclination of an optical axis of the emission light at each position of the emission side main surface of the diffuser plate, an inclination of an optical axis of the projection light at each position of the projection side main surface of the diffuser plate, and a light distribution property of the emission light such that the optical axis of the emission light is different than the normal axis of the projection side main surface and a cross sectional shape of the inclination coping lens in a height direction of the inclination coping lens from a base reference surface of the inclination coping lens to an upper surface of the inclination coping lens has an asymmetrical cross sectional shape around the optical axis of the projection light, wherein
in the designing, lens designing parameters comprise a center position displacement amount for displacing a center position of the lens.

12. The method according to claim 11, wherein in the designing, the lens designing parameters further comprise a lens inclination amount.

13. The method according to claim 11, wherein in the designing, the lens designing parameters further comprise a lens curvature radius change amount for enlarging or reducing a lens curvature radius.

14. The method according to claim 11, wherein in the designing, the lens designing parameters further comprise an adjustment amount for adjusting a lens shape by a cubic function or a similar function.

15. The method according to claim 11, wherein the reference microlens has a toroidal shape, or a biconical surface.

16. A diffuser plate, comprising:
a projection side main surface to which projection light is projected;
an emission side main surface for emitting emission light; and
a fine structure having a lens function on at least one of the projection side main surface and the emission side main surface, wherein
a numerical aperture NA of the projection light is greater than 0 and 0.140 or less,
the fine structure has a plurality of microlens shape parts,
an incident angle Θi formed by an optical axis of the projection light at the microlens shape part and a normal axis of the projection side main surface intersecting with each other is in a range from 0 to 50 degrees,
at least one of the plurality of microlens shape parts emits the emission light at an emission angle Θo formed by an optical axis of the emission light at the microlens shape part and the normal of the projection side main surface intersecting with each other,
the emission angle Θo is different from the incident angle Θi,
the emission light has even luminance in a predetermined diffusion angle range, and a cross sectional shape of the microlens shape part in a height direction of the microlens shape part from a microlens reference surface of the microlens shape part to an upper surface of the microlens shape part has an asymmetrical cross sectional shape around the optical axis of the projection light, in a measurement luminance distribution to a diffusion angle, when a diffusion angle corresponding to a position of the optical axis of the emission light is designated as an optical axis diffusion angle Θa, an integrated value To of a measurement luminance from a minimum angle Θmin in a predetermined range of the diffusion angle to the optical axis diffusion angle Θa is 50% of an integrated value Ta of the measurement luminance in an entire range of the diffusion angle, an absolute value of a difference of an angle formed by the optical axis of the projection light and the optical axis of the emission light intersecting with each other varies within 0-40 degrees, and a luminance Ls at a predetermined diffusion angle Θs and a luminance Lb at a predetermined diffusion angle Θb respectively correspond to 70% of an optical axis luminance Lo at the optical axis of the emission light, and when the predetermined diffusion angle Θs is smaller than the optical axis diffusion angle Θa and the predetermined diffusion angle Θb is larger than the optical axis diffusion angle Θa, an evenness evaluation index Ts/Tb that is a ratio of an integrated value Ts of a luminance obtained by subtracting Lo*0.7 from each luminance from the predetermined diffusion angle Θs to the optical axis diffusion angle Θa and an integrated value Tb of a luminance from the optical axis diffusion angle Θa to the predetermined diffusion angle Θb satisfies D<Ts/Tb<1/D, and a lower limit value D of an allowable range of the evenness evaluation index Ts/Tb satisfies D=0.63*exp(0.45*((90−(Θs+Θb))/90)^2).

17. A diffuser plate, comprising:

a projection side main surface to which projection light is projected;

an emission side main surface for emitting emission light; and a fine structure having a lens function on at least one of the projection side main surface and the emission side main surface, wherein a numerical aperture NA of the projection light is greater than 0 and 0.140 or less, the fine structure has a plurality of microlens shape parts, an incident angle Θi formed by an optical axis of the projection light at the microlens shape part and a normal axis of the projection side main surface intersecting with each other is greater than 0 degrees and 50 degrees or less, at least one of the plurality of microlens shape parts emits the emission light at an emission angle Θo formed by an optical axis of the emission light at the microlens shape part and the normal of the projection side main surface intersecting with each other, the emission angle Θo is the same as the incident angle Θi, the emission light has even luminance in a predetermined diffusion angle range, and a cross sectional shape of the microlens shape part in a height direction of the microlens shape part from a microlens reference surface of the microlens shape part to an upper surface of the microlens shape part has an asymmetrical cross sectional shape around the optical axis of the projection light, in a measurement luminance distribution to a diffusion angle, when a diffusion angle corresponding to a position of the optical axis of the emission light is designated as an optical axis diffusion angle Θa, an integrated value To of a measurement luminance from a minimum angle Θmin in a predetermined range of the diffusion angle to the optical axis diffusion angle Θa is 50% of an integrated value Ta of the measurement luminance in an entire range of the diffusion angle, an absolute value of a difference of an angle formed by the optical axis of the projection light and the optical axis of the emission light intersecting with each other varies within 0-40 degrees, a luminance Ls at a predetermined diffusion angle Θs and a luminance Lb at a predetermined diffusion angle Θb respectively correspond to 70% of an optical axis luminance Lo at the optical axis of the emission light, and when the predetermined diffusion angle Θs is smaller than the optical axis diffusion angle Θa and the predetermined diffusion angle Θb is larger than the optical axis diffusion angle Θa, an evenness evaluation index Ts/Tb that is a ratio of an integrated value Ts of a luminance obtained by subtracting Lo*0.7 from each luminance from the predetermined diffusion angle Θs to the optical axis diffusion angle Θa and an integrated value Tb of a luminance from the optical axis diffusion angle Θa to the predetermined diffusion angle Θb satisfies D<Ts/Tb<1/D, and a lower limit value D of an allowable range of the evenness evaluation index Ts/Tb satisfies D=0.63*exp(0.45*((90−(Θs+Θb))/90)^2).

\* \* \* \* \*